US011430018B2

(12) United States Patent
Taifi et al.

(10) Patent No.: US 11,430,018 B2
(45) Date of Patent: Aug. 30, 2022

(54) LINE ITEM-BASED AUDIENCE EXTENSION

(71) Applicant: Xandr Inc., New York, NY (US)

(72) Inventors: Moussa Taifi, Jackson Heights, NY (US); Yana Volkovich, New York, NY (US); Carlos Eduardo Rodriguez Castillo, Brooklyn, NY (US)

(73) Assignee: Xandr Inc., New York, NY (US)

( * ) Notice: Subject to any disclaimer, the term of this patent is extended or adjusted under 35 U.S.C. 154(b) by 268 days.

(21) Appl. No.: 16/748,259

(22) Filed: Jan. 21, 2020

(65) Prior Publication Data
US 2021/0224862 A1    Jul. 22, 2021

(51) Int. Cl.
*G06Q 30/00* (2012.01)
*G06Q 30/02* (2012.01)
*G06K 9/62* (2022.01)
*G06N 20/00* (2019.01)

(52) U.S. Cl.
CPC ....... *G06Q 30/0277* (2013.01); *G06K 9/6218* (2013.01); *G06N 20/00* (2019.01); *G06Q 30/0256* (2013.01); *G06Q 30/0261* (2013.01); *G06Q 30/0275* (2013.01)

(58) Field of Classification Search
CPC ..... G06Q 30/0239-0277; G06N 20/00; G06K 4/6218; G06K 4/6268
See application file for complete search history.

(56) References Cited

U.S. PATENT DOCUMENTS

| 7,231,358 | B2 * | 6/2007 | Singh | G06Q 30/0257 |
| | | | | 705/14.54 |
| 7,835,943 | B2 * | 11/2010 | Cheung | G06F 16/951 |
| | | | | 705/14.69 |
| 10,115,124 | B1 * | 10/2018 | Kamvysselis | G06Q 30/0244 |
| 2008/0281694 | A1 * | 11/2008 | Kretz | G06Q 30/02 |
| | | | | 705/14.64 |
| 2009/0063268 | A1 * | 3/2009 | Burgess | G06Q 30/0239 |
| | | | | 705/14.39 |

(Continued)

OTHER PUBLICATIONS

Fan, Teng-Kai and Chang, Chia-Hui. "Sentiment-Oriented Contextual Advertising." Knowledge Information Systems, vol. 23, pp. 321-344, Jun. 25, 2009. (Year: 2009).*

(Continued)

*Primary Examiner* — Luis A Brown
(74) *Attorney, Agent, or Firm* — Guntin & Gust, PLC; John G. Rauch

(57) ABSTRACT

Aspects of the subject disclosure may include, for example, receiving from a campaign manager device information defining a line item in an online advertising system, including receiving information defining constraints for the line item. The subject disclosure may further include collecting browsing history information for targetable users matching the constraints for the line item, generating a machine learning model to rank the targetable users and building a new segment based on users ranked by the model. The subject disclosure may further include providing, to the campaign manager device, a recommendation to add the new segment to the line item, receiving from the campaign manager device an indication to attach the new segment to the line item, and subsequently, providing advertisement content to targeted users according to the line item including the new segment. Other embodiments are disclosed.

20 Claims, 15 Drawing Sheets

(56) References Cited

U.S. PATENT DOCUMENTS

| | | | | |
|---|---|---|---|---|
| 2010/0324996 | A1* | 12/2010 | Kim | G06Q 30/02 705/14.66 |
| 2012/0109664 | A1* | 5/2012 | Krishnapuram | G06Q 30/02 705/1.1 |
| 2016/0180248 | A1* | 6/2016 | Regan | G09B 5/00 706/12 |
| 2017/0201781 | A1* | 7/2017 | Itwaru | H04N 21/4788 |
| 2017/0308792 | A1* | 10/2017 | Liang | G06Q 10/02 |
| 2017/0308924 | A1* | 10/2017 | Jeon | G06Q 30/0269 |
| 2017/0330239 | A1* | 11/2017 | Luo | G06F 9/46 |
| 2017/0371890 | A1* | 12/2017 | Seker | G06F 16/162 |
| 2018/0060915 | A1* | 3/2018 | Liu | G06Q 30/0269 |
| 2019/0005409 | A1* | 1/2019 | Doshi | G06Q 30/0631 |
| 2021/0224862 | A1* | 7/2021 | Taifi | G06Q 30/0277 |

OTHER PUBLICATIONS

Barkan, Oren et al., "ITEM2VEC: Neural Item Embedding for Collaborative Filtering", Tel Aviv University; Microsoft, Feb. 20, 2017, 6 pages.

Github, "Github—Maciejkula/Spotlight: Deep Recommender Models Using Pytorch", https://github.com/maciejkula/spotlight, Sep. 25, 2019, 4 pages.

Grbovic, Mihajlo et al., "Real-Time Personalization Using Embeddings for Search Ranking at Airbnb", Proceedings of the 24th ACM SIGKDD International Conference on Knowledge Discovery & Data Mining, Aug. 19-23, 2018, 10 pages.

Kenthapadi, Krishnaram et al., "Personalized Job Recommendation System at Linkedin: Practical Challenges and Lessons Learned", Interesting Domains, RecSys'17, Aug. 27-31, 2017, pp. 346-347.

Mikolov, Tomas et al., "Distributed Representations of Words and Phrases and Their Compositionality", Oct. 16, 2013, 9 pages.

Paszke, Adam, "Automatic Differentiation in Pytorch", 31st Conference on Neural Information Processing Systems (NIPS 2017), 2017, 4 pages.

Pennington, Jeffrey et al., "Glove: Global Vectors for Word Representation", Proceedings of the 2014 Conference on Empirical Methods in Natural Language Processing (EMNLP), Oct. 25-29, 2014, pp. 1532-1543.

Seyler, Dominic et al., "An Information Retrieval Framework for Contextual Suggestion Based on Heterogeneous Information Network Embeddings", Jul. 8-12, 2018, 4 pages.

Smilkov, Daniel et al., "Embedding Projector: Interactive Visualization and Interpretation of Embeddings", 30th Conference on Neural Information Processing Systems (NIPS 2016), Nov. 16, 2016, 4 pages.

Van Der Maaten, Laurens et al., "Visulaizing Data Using t-SNE", Journal of Machine Learning Research 9; 2579-2605, Nov. 2008, 27 pages.

\* cited by examiner

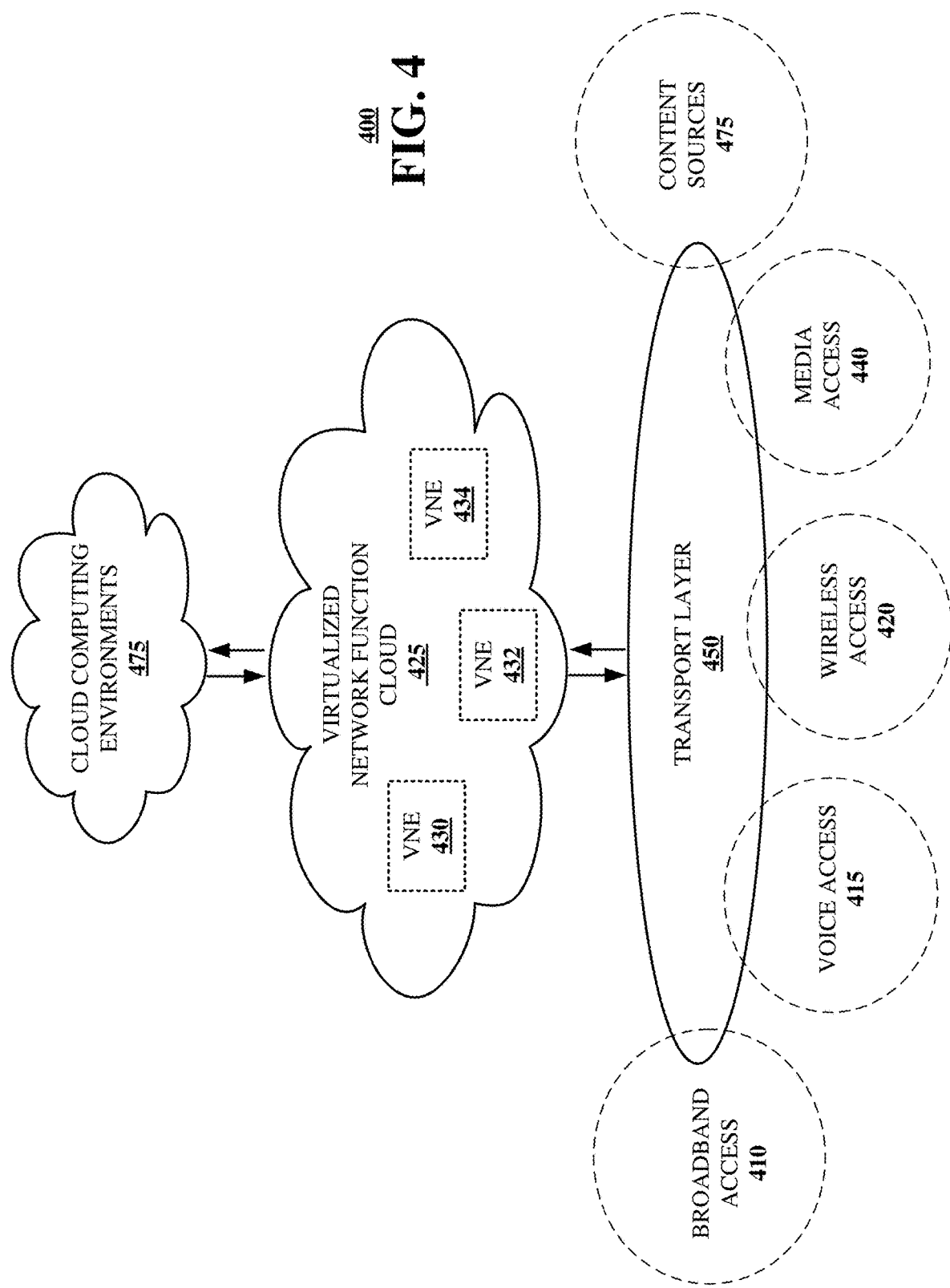

LINE ITEM-BASED AUDIENCE EXTENSION

FIELD OF THE DISCLOSURE

The subject disclosure relates to line item-based audience extension in online content delivery systems.

BACKGROUND

Advertisers and advertising agencies use online content delivery systems to buy online advertising opportunities. A line item is an object in an online system that represents an advertising campaign. Advertisers explicitly target users in market segments. A line item has performance goals and delivery goals for the advertising campaign.

BRIEF DESCRIPTION OF THE DRAWINGS

Reference will now be made to the accompanying drawings, which are not necessarily drawn to scale, and wherein:

FIG. 4 is a block diagram illustrating an example, non-limiting embodiment of a virtualized communication network in accordance with various aspects described herein.

DETAILED DESCRIPTION

Figure 1:
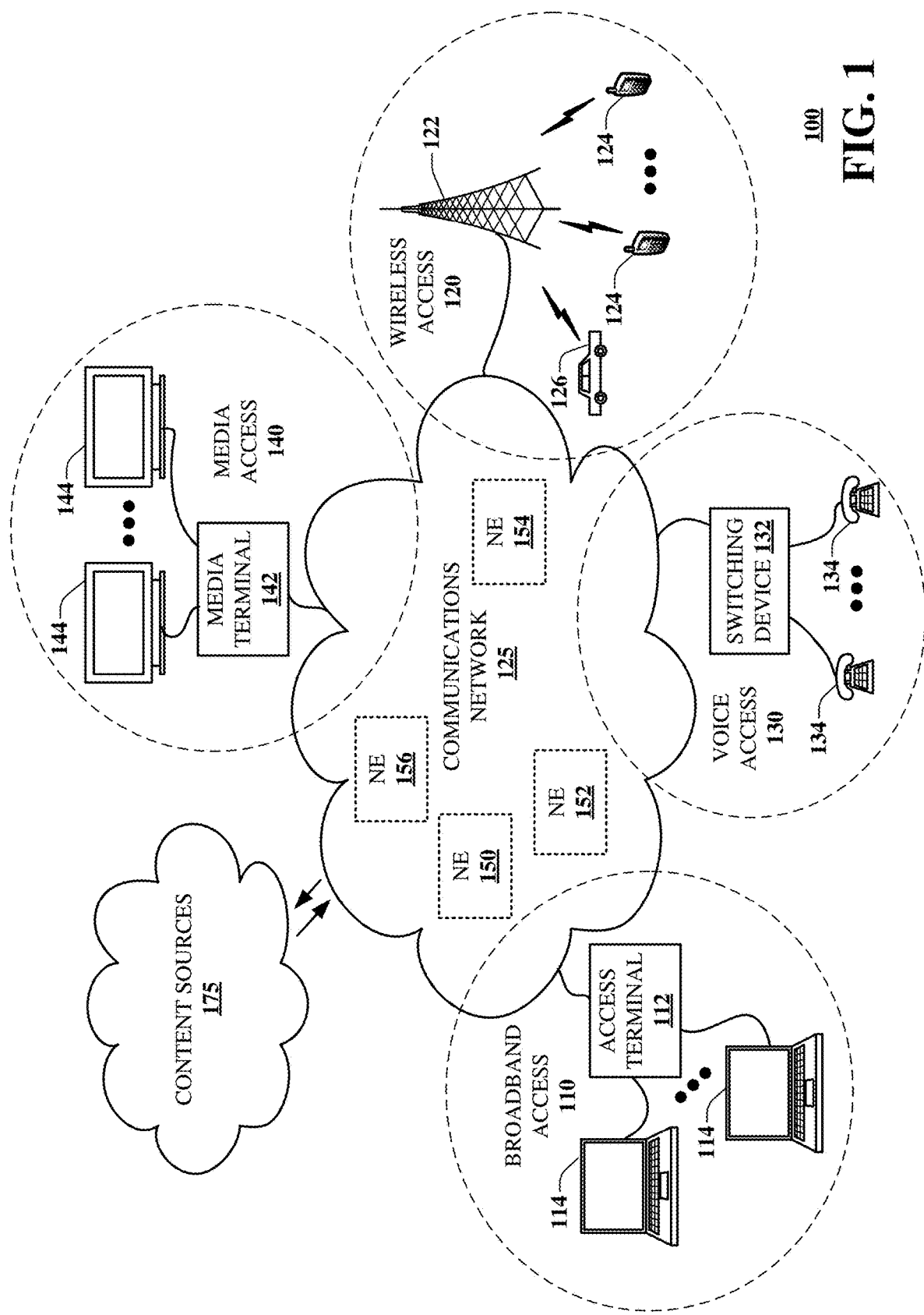
FIG. 1 is a block diagram illustrating an exemplary, non-limiting embodiment of a communications network in accordance with various aspects described herein.

The subject disclosure describes, among other things, illustrative embodiments of audience extension in online networked systems. Other embodiments are described in the subject disclosure.

One or more aspects of the subject disclosure include a device having a processing system including a processor and a memory that stores executable instructions that, when executed by the processing system, facilitate performance of operations. The operations may include receiving from a campaign manager device information defining a line item in an online advertising system, wherein the receiving comprises receiving information defining constraints for the line item. The subject disclosure further includes collecting browsing history information for targetable users matching the constraints for the line item, generating a machine learning model to rank the targetable users and building a new segment based on users ranked by the model. The subject disclosure further includes providing, to the campaign manager device, a recommendation to add the new segment to the line item, receiving from the campaign manager device an indication to attach the new segment to the line item, and subsequently, providing advertisement content to targeted users according to the line item including the new segment.

One or more aspects of the subject disclosure include a method including steps of receiving, by a processing system including a processor, identification information defining a line item of an online advertising system and constraint information defining constraints for the line item, wherein the receiving identification information comprises receiving the identification information from a campaign manager device associated with the line item. Other aspects of the subject disclosure include collecting, by the processing system, browsing history information for targeted users targeted by the line item and browsing history information for targetable users in the online advertising system, and training, by the processing system, a machine learning model, wherein the training comprises using the browsing history information for targetable users. Other aspects of the subject disclosure include providing, by the processing system, the browsing history information for targeted users as an input to the machine learning model, receiving, by the processing system, from the machine learning model, information defining recommended user identifiers associated with at least some of the targetable users, and creating, by the processing system, a new segment, wherein the creating the new segment comprises combining the information defining recommended user identifiers to form the new segment.

One or more aspects of the subject disclosure include a machine-readable medium comprising executable instructions that, when executed by a processing system including a processor, facilitate performance of operations. The operations may include receiving information about a line item of an online content delivery system, the information identifying a plurality of targeted users of the line item, wherein the receiving comprises receiving the information from a campaign manager device associated with the line item. The operations may further include collecting browsing history of users in the online content delivery system, predicting, using a machine learning model, a list of users likely to behave similarly to the targeted users, and forming a new segment from the list of users. The operations may further include providing information about the new segment to the campaign manager device, receiving, from the campaign manager device, an indication to attach the new segment to the line item, and, subsequently, providing content to the targeted users according to the line item including the new segment.

Referring now to FIG. 1, a block diagram is shown illustrating an example, non-limiting embodiment of a communications network 100 in accordance with various aspects described herein. For example, communications network 100 can facilitate in whole or in part an online content delivery system which conducts an auction among bids to serve an advertisement to a web page to fill an impression, and in which the audience available to view content items may be automatically expanded. The communication network 100 can implement a ratio pacing system to detect and compensate for unintentional bias or skew introduced in serving of content items. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. Media terminal 142 can include any type of user device such as a mobile phone or smart phone, a tablet, a laptop or desktop computer or connected television devices which can be connected to the internet and access content beyond what is available via the normal offering from a cable provider. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display device. The display devices 144 can include connected television devices which can be connected to the internet and access content beyond what is available via the normal offering from a cable provider.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
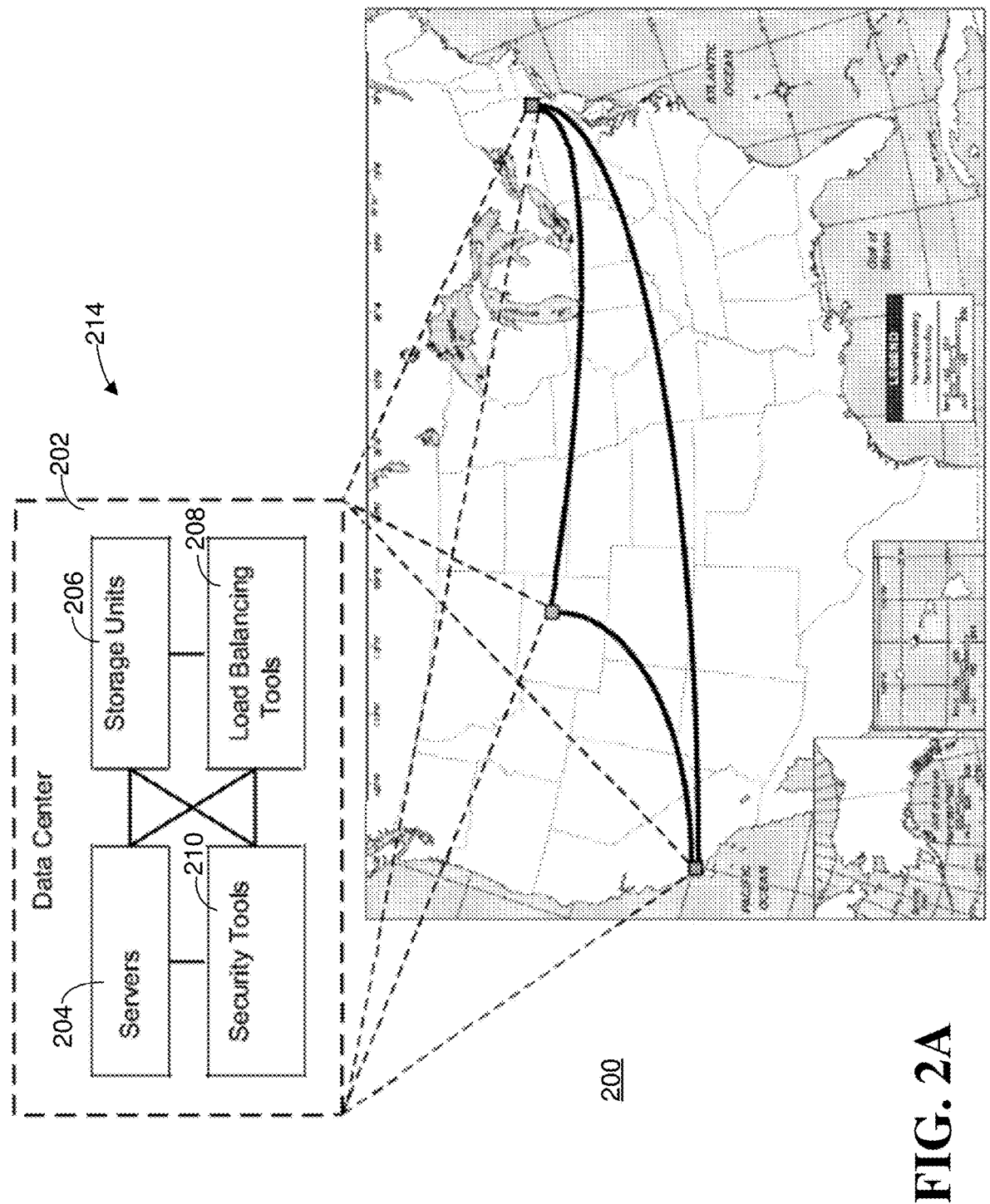
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communications network 100 of FIG. 1 in accordance with various aspects described herein. The system 200 may be operable to facilitate in whole or in part an online content delivery system which conducts an auction among bids to serve an advertisement to a web page to fill an impression. The system 200 can implement an audience extension system for automatically increasing delivery for ad campaigns or line items by finding and targeting users similar to those explicitly targeted by an ad campaign or line item.

FIG. 2A shows an exemplary embodiment of geographically dispersed multi-tenant enterprise data centers 202 that are connected via one or more communication backbone networks (illustratively depicted by the heavy black lines). The communication backbone networks enable high-speed and high-volume data communications among the data centers. In an exemplary embodiment, a data center 202 generally includes a plurality of servers 204, storage units 206, load balancing tools 208 and security tools 211. The servers 204 generally receive data over one or more communication backbone networks, process data and provide data over one or more communication backbone networks. The data center 202 may host data processing and storage for one or more tenants who are given access to components such as the servers 204 and the storage units 206. The storage units 206 operate to store data for access by other components such as the servers. The load balancing tools may operate to manage traffic within a single data center 202 and between multiple data centers 202, and for routing data between users a preferred or fastest data center 202. The security tools 210 may operate to protect each tenant's data and privacy. Other resources including power, cooling and telecommunication-related resources (not shown) are also included in each data center 202. The data centers 202 may interact with other networks such as the public internet to communicate data with other equipment associated with the tenants, users of tenant networks and others as well.

An infrastructure computer system for an advertising platform may be hosted on one or more of the data centers 202. This infrastructure computer system may be referred to in some embodiments as an advertising platform 214. The advertising platform 214 may operate in an impression trading industry in which advertising creatives are matched with impressions, or spaces on web pages, video feeds and other locations that may be viewed by users. The advertising platform 214 may provide an ecosystem or network or cloud in which entities associated with an impression trading industry may collaborate and share industry-specific information without latency, bandwidth, and security issues that may be associated with the public Internet. The impression trading industry may connect for purposes of sharing information and commerce disparate parties such as users, a bidding provider, members, publishers and others. Such industry-specific information shared within the advertising platform may include information associated with one or more users, one or more bidding providers, one or more members, one or more publisher pages, prices, advertising creatives, or any suitable combination thereof.

The advertising platform 214 includes servers 204 of the data center 102 that have been provisioned and deployed by data center tenants using application programming interface (APIs) specific to the advertising platform 214. In general, each server 204 that is provisioned and deployed by a tenant is reserved for the exclusive use of that tenant. Doing so provides some measure of predictability with respect to available resources. Reservation of resources for exclusive use of a tenant provides security and privacy with respect to the tenant's data.

Various tenants of the data center 202 may assume different roles in the context of the impression trading industry. Tenants of the data center 202 may include advertising platform providers, impression selling members, impression buyer member, and bidders. Other tenants may be hosted as well.

An advertising platform provider is an entity which provisions and deploys one or more servers 254 of the data center 202 to function as a transaction management computing subsystem. A transaction management subsystem may also be referred to as a platform impression bus or simply Imp Bus. The Imp Bus facilitates the transaction aspects of impression inventory trading. In general, the Imp Bus processes ad requests, feeds data to members, conducts auctions, returns ads to the publishers, keeps track of billing and usage, returns auction-result data, and enforces quality standards. The Imp Bus may be implemented by any suitable computing device, system etc., that performs the various functions described herein.

An impression seller member is an entity that sells impression inventory. An impression seller member may be, for example, a publisher of a web site or a video game or other online resource. An impression seller member may provision and deploy one or more servers 204 of the data center 202 to function as a web delivery engine that accepts HTTP requests from web browsers operable by impression consumers. Such a web delivery engine may implement a variety of functions or features, such as authentication and authorization request, handling of static and dynamic content, content compression support, virtual hosting, large file support, and bandwidth throttling or management. Equipment of the impression seller member may provide other functions, as well.

An impression buyer member may be an entity that buys impression inventory. An impression buyer member may provision and deploy one or more servers 204 of the data center 202 to operate to serve advertising creatives or simply creatives. Creatives are data which define an advertisement adapted to fill an impression on a web page, in a video stream or in another location. In some instances, creatives are stored on a storage unit 206 within the data center 202, and the servers 204 of the impression buyer member will serve such creatives directly from the storage units 206 of the data center 202. In some instance, creatives are stored on an ad server or a content delivery network located on a server located remotely, outside of the data center 202. In such instance, the servers 204 of the impression buyer will facilitate the serving of creatives from the remote server. The entity may be an advertiser, an advertising network, an advertising agency, an advertising exchange, or a publisher.

To buy impression inventory, each impression buyer member engages a decisioning computing subsystem to operate on its behalf. Such a decisioning computing system may be referred to as a bidder. The term bidder generally refers to a computing system or other technological items rather than a person or entity that operates it. In a typical embodiment, a bidder includes a bidding engine that takes various pieces of bid-specific information as input and generates a bid for a particular item of impression inventory on behalf of an impression buyer member.

The advertising platform provides impression buyer members with a number of different bidder options. These include, for example, using a member-specific bidder. According to this option, the advertising platform provider provides a source code skeleton and allows an impression buyer partner to customize with priority information. In this case, the entity that buys impression inventory will further deploy a server 204 of the data center 202 to host a member-specific bidder for its exclusive use.

In another option, a hosted bidder is designed, built, hosted, and maintained by the advertising platform provider and allows each impression buyer member to simply upload bid guides or modify basic parameters, such as user data, recency, location, etc. In some instances, multiple impression buyer members use the hosted bidder.

In another option a bidding provider is an entity that provisions and deploys a server 204 of the data center 202 to operate a bidder on behalf of one or more impression buyer members with which it is contractually engaged. The bidder operable by the bidding provider generally includes a proprietary optimization bidding engine.

In some embodiments, tenants of the data center 202 may further assume additional or different roles than that described above. In some embodiments, the data center 202 and the advertising platform 214 may include other participants and tenants, in addition to those described above.

The advertising platform 214 also includes a cluster of high-performance storage units 206 of the data center 202. Data stored by a tenant on a storage unit 206 of the data center 202 may be accessed exclusively by that tenant or shared with other tenants within the data center if so configured. The types of data that may be stored include advertising tags or ad tags, reserve price information, advertising creatives, reserve creative information, cookie information, and market analysis information. Other information that may facilitate the trading of impression inventory within the advertising platform 214 may also be stored on storage units 206 of the data center 202.

The interactive nature of the Internet provides a number of advertising solutions that take advantage of the two-way communication and direct connections established between browser and content server for every user. Web pages, web-enabled video games, web-based broadcasts of multimedia programming, and web-enabled photo frames are just a few examples of the types of multimedia streams in which electronic advertisements may be injected. Traditionally, creatives, including still images and video advertisements, appear in ad spaces that are located within a web page, a video stream or other location. More recently, web-enabled video games have been coded to enable a creative to be dynamically loaded within an ad space of a game frame, such as in an image of a billboard on the side of a highway of a car racing game, or in signage appearing to be affixed to a roof of a taxi cab in a role playing game. Similarly, web-based broadcasts of multimedia programming, such as a live broadcast or on-demand replay of a sporting event, may be coded to enable a creative to be dynamically loaded within an ad space of a broadcast frame. Examples include an ad space behind home plate during the broadcast of the sporting event. A creative may be inserted within an ad space between broadcast frames, such as an ad space that coincides with a live commercial break. Web-enabled photo frames are generally configured to receive digital photos from photo sharing sites, RSS feeds, and social networking sites or other sources through wired or wireless communication links. Other electronic content, such as news, weather, sports, and financial data may also be displayed on the web-enabled photo frame.

Each of the multimedia stream types described above provides a host of creative serving opportunities. To facilitate the transaction of impression inventory on the advertising platform 214, an impression seller member such as a publisher of a web site or a video game may associate each creative serving opportunity with an ad tag. In general, an ad tag includes data or a data file that specifies information indicative of attributes of an ad space with which the ad tag is associated. In the case of an ad space within a web page, the ad tag may specify, for example, the language of the text displayed on the page; the nature of the content being displayed on the page, such as business, politics, entertainment, sports, and technology; the geographical focus, such as international, national, and local, of the web page content; the physical dimensions of the ad space; and the region of the page the ad space is located. In the case of an ad space within a web-enabled video game, the ad tag may specify the video game category, such as role playing, racing, sports, puzzle, and fighting; the age appropriateness of the video game, such as via an Entertainment Software Rating Board (ESRB) rating symbol, including for example, early childhood, everyone, everyone age 10 and over, mature, teen, and adults only; and the nature of the content being displayed within the game frame, such as via an Entertainment Software Rating Board (ESRB) content descriptor, such as alcohol reference, animated blood, crude humor, intense violence, language, mature humor, nudity, tobacco reference, and drug reference. In the case of an ad space within a web-based broadcast of multimedia programming, the ad tag may specify the language of the audio associated with the programming; the nature of the content associated with the programming, such as business, politics, entertainment, sports, and technology; the geographical focus of the programming; and the time of day the programming is being broadcast live or the time period in which the programming is available on demand. For example, ad providers might have a registration system on their supply and, therefore, they have deterministic access to their user's demographic information. Then, they could pass some or all user demographic information voluntary or by an agreement to the bidder to increase the value of their impressions.

In some implementations of the advertising platform 214, a platform-specific ad tag may be generated and associated with one or more ad spaces. In addition to the types of information described above, other types of information, such as a universal inventory identifier, a reserve price, and a list of approved universal advertiser identifiers, may also be associated with a platform-specific ad tag. The information associated with any given platform-specific ad tag may be specified server-side, such as tag_id=123&ad_profile_id=456, or maintained within the platform by a server-side mapping, such as when the Imp Bus maintains a server-side mapping of tag_id=123 to ad_profile_id=456. In the latter case, once an ad space has been tagged, information associated with the platform-specific ad tag may be easily modified by adding or otherwise changing the information within the platform without having to re-tag the ad space.

Each universal inventory identifier uniquely identifies a multimedia stream within the platform. As an example, a multimedia stream identified as large, such as the news website CNN.com may be divided into multiple multimedia streamlets such as CNN.com/entertainment, CNN.com/health, CNN.com/technology, and CNN.com/travel. In this example, each multimedia streamlet is assigned a universal inventory identifier within the platform. By contrast, a multimedia stream designated as small, such as the news website BostonHerald.com) may be assigned only one universal inventory identifier. The inclusion of a universal inventory identifier within a platform-specific ad tag enables bidders to refer to impression inventory associated with a particular multimedia stream in a common way. The size of the impression inventory associated with a multimedia stream is not the only factor in determining whether a multimedia stream is assigned one universal inventory identifier or multiple universal inventory identifiers. Other factors, such as the multimedia stream brand, may also be used. For example, a single universal inventory identifier may be assigned to a multimedia stream designated as large, such as web pages with a myspace.com domain name, based on its brand identity.

In some cases, a multimedia stream or some aspect of it includes impression inventory that is designated within the platform as direct inventory. In general, direct inventory refers to impression inventory that is part of a pre-existing media buy. Such a media buy is typically established by way of a contractual agreement between an impression seller member and an impression buyer member. The contractual agreement specifies the specific impression inventory that is subject to an exclusive first right of refusal on the part of the impression buyer member, and the reserve price that bidders other than the bidder operating on behalf of the impression buyer member must meet in order to take the impression inventory away. This process will be described in more detail below with respect to the exemplary use cases in the following section.

In some cases, a multimedia stream or some aspect of it includes impression inventory that may only be acquired by certain impression buyer members, or more specifically, impression buyer members that serve a specific brand of ad creatives. In such cases, a bidder performs an offline process that synchronizes creatives and/or brands that are approved or banned to run on the impression inventory with a specific ad profile ID that is subsequently passed along on the bid request.

Ad creatives for various campaigns may be stored in storage units 206 of the data center 202 that function as an ad server for an impression buyer partner or hosted on ad servers and content delivery networks outside of the platform.

In some implementations of the advertising platform 214, an impression buyer partner may be required to provide information that characterizes each ad creative that may be served responsive to ad calls from the platform and store such information within the platform. Such information may include attribute information that characterizes the type, dimensions, and content of the ad creative, and information that identifies a location where the ad creative can be retrieve, such as a redirect to a content delivery network. In other implementations of the advertising platform 214, it is merely recommended that such information be stored within the platform and therefore accessible by the bidder acting on behalf of the impression buyer partner with minimal latency during the real-time bidding process. In still other implementations of the advertising platform 214, the advertising platform provider itself looks at the creatives and supplies any of these attributes.

In some embodiments, the creatives that are served in response to ad calls from the advertising platform 214 conform to requirements, such as legality, decency, and common sense. For instance, creatives that promote gambling; depict libelous, violent, tasteless, hate, derogatory, or illegal content; portray partial or complete nudity, pornography, and/or adult themes or obscene content; are deceptive or purposely mislabeled; or spawn pops, simulate clicks, or contain malicious code, viruses, or executable files are generally not permitted.

Some publishers may prefer the creatives that are served to their inventory to comply with even more restrictive standards. For instance, such standards may be in place in order to maintain the reputation of the publisher's brand or to avoid promoting a rival. To simplify and speed the creative approval process for publishers, a list of preapproved creatives may be generated and maintained by a creative auditing computing subsystem on the advertising platform. When creating ad profiles, impression seller members can search for and/or elect to automatically approve creatives on this list, thus effectively outsourcing initial creative approval to a platform-based audit. For instance, the platform-based audit may review creatives for features such as having a meaningful and easily discernable brand or product offering; rotating images but not rotating brands or products; and having a brand on a platform-based list of approved brands. Additionally, the platform-based audit may prohibit creatives offering sweepstakes, giveaways, quizzes, surveys, or other brand-less games. If a brand is not discernable in a creative, it will not be approved and will run only on a member's exclusive inventory. Creatives that are modified after they have been audited will return to a pending status until they can be audited again. In some instances, advertisers may be charged a nominal fee in order to have their creatives audited.

Impression seller members such as publishers may also review and approve creatives on a case-by-case basis by creating an ad profile. A default ad profile may be created for a publisher. If no default ad profile is created for a publisher, all creatives may be allowed to run on the publisher's domain. In some embodiments, an ad profile includes three elements: members, brands, and creatives. Member- and brand-level approval standards can be used to reduce the number of creatives that need to be explicitly approved. For instance, when setting up the ad profile, a publisher may choose a designation such as trusted for members and brands that the publisher believes will always present acceptable ads. If a member or brand is marked or otherwise designated as trusted, all creatives of that member or brand may run by default, mitigating the need to audit each of that member's/brand's creatives. However, in some embodiments, the publisher or other seller member can override this default by reviewing the creatives and banning or otherwise designating individually any creatives of the trusted brand. The publisher may mark other members or brands as with a designation such as case-by-case, meaning that none of the creatives of that member or brand will run until explicitly approved by the publisher. The publisher may also designate or mark members or brands as banned, in which case none of the creatives of the banned member or brand will be shown. If a member or brand is banned, there is no ability to override the ban and approve a specific creative without knowing and searching for an individual creative identifier. In some instances, a separate ad profile may be created for each advertising campaign.

The ad profiles may be stored by the transaction management computing subsystem in an impression seller data store associated with the corresponding impression seller member. Ad profiles may further be updated or replaced in storage upon receipt of a new or updated profile.

For more granular control over quality standards, the publisher or other seller member may also be designated as approved or banned or otherwise at the level of individual creatives. To review specific creatives, the publisher can search for creatives using specific criteria. A preview of the creative will appear and the publisher selects whether to approve or ban the creative.

Similarly, in some embodiments, publishers or other seller members may be required to conform to stated standards of legality, decency, and common sense. For instance, publishers that embody any of the following characteristics may not be permitted to participate in the advertising platform: desktop applications, download accelerators, non-website based widgets and/or toolbars; gambling, including free, paid, or gateway to paid gambling; libelous, violent, tasteless, hate, defamatory, or illegal content; or nudity, pornography, and/or adult themes or obscene content; peer to peer, bit torrent, or other websites facilitating illegal file sharing; proxy sites facilitating anonymous web browsing; sites enabling or permitting illegal activities and/or copyright infringement; or Warez or mp3 downloads.

Inventory of impressions may be grouped into predefined lists such that bidder clients can make decisions about a large amount of inventory simply by knowing the group to which the inventory belongs. The site that each impression that passes through the Imp Bus belongs to is on a single class list. The list to which a particular site and its corresponding impression belongs is communicated along with the ad call to each bidder participating in an auction. Individual bidders are then free to make their own decisions about whether to bid on that impression.

Impressions may be grouped or categorized in any convenient manner. In one example, inventory may be designated or categorized as Class 1, Class 2, unaudited or Blacklist. In this example, Class 1 inventory has been audited by a platform-based auditor and represents many of the most popular publisher brands on the Internet. Each of the Uniform Resource Locators (URLs) on the Class 1 list has a minimum monthly volume, such as 100,000 impressions per month, and is certified to pass global inventory content standards. The Class 1 list is intended to be completely safe for any brand advertiser to purchase. Class 1 inventory does not contain sites that feature user-generated content or social media. Bidders accept Class 1 inventory by default.

Class 2 inventory in this example includes inventory that has been audited but does not meet the Class 1 volume or content criteria, but does meet the global inventory content standards. Social networking content may be included in Class 2 inventory. For instance, myspace.com, although a top publisher that by volume satisfies the Class 1 criteria, in this example is placed on the Class 2 list because it is designated as a social media web site. Bidders accept Class 2 inventory by default. If a bidder has chosen not to accept Class 2 inventory but also owns a Class 2 publisher, the bidder will receive its own Class 2 traffic.

All other inventory that passes through the Imp Bus is assigned the unaudited inventory label in this example. Sites remain categorized as unaudited until audited and assigned to another categorization. To ensure maximum advertiser brand protection, bidders by default do not accept unaudited inventory. However, a flag or other indicator can be set to enable acceptance of unaudited inventory if desired. In another example, if a bidder does not accept unaudited inventory but owns an unaudited publisher, the bidder will receive its own unaudited traffic.

Further in this example, inventory designated or contained in the Blacklist violates inventory content standards and has been prohibited. For example, prohibition may mean that impressions on the Blacklist will never reach the auction marketplace.

In some implementations of the advertising platform, a multi-tenant user data store is provisioned within the advertising platform 214 by a first user data store management component to enable members of the impression trading industry. The multi-data tenant store may also be referred to as a server-side user data store. The multi-data tenant store operates to synchronize user data information with a common set of platform-specific user identifiers, or user IDs.

In some embodiments, each platform-specific user ID of the server-side user data store is stored in association with data. Some of the stored may be specific to a particular impression consumer, such as data characterizing the impression consumer. In general, data that is stored in association with a platform-specific user ID may be supplemented and over the course of time as the impression consumer interacts with web pages and web delivery engines within the advertising platform 214.

In some implementations, all data stored in association with a platform-specific user ID may be shared between all tenants of the data center(s). In other implementations, mechanisms may be put in place to limit access to the data stored in association with a platform-specific user ID based on certain criteria. For example, certain impression trading industry members may have contractual agreements that specify exclusive sharing of data stored in association with a particular set or sets of platform-specific user IDs regardless of which web delivery engine a content request is directed to. In another example, an impression trading industry member may specify that all data stored in association with a particular set or sets of platform-specific user-ids may be shared with respect to a particular set of web delivery engines, some of which may be associated with other impression trading industry members.

In one specific implementation, user data information stored in association with a platform-specific user ID is formed by multiple segments of key-value pairs, where one or more key-value pairs may define each segment. Access permissions may be associated with one, some, or all of the segments to control which members access the user data information of respective segments. Accessing user data information may include reading, writing such data.

One issue that may arise following the serving of ads to a single impression consumer by impression seller partners located in geographically dispersed data centers is "synching collision." Synching collision occurs when multiple impression seller members attempt to simultaneously sync their user data information with a particular segment of key-value pairs that defines the user data information stored in association with a particular impression consumer's platform-specific user-id. This is best described with an example.

In the example, a user identified by user ID 12345 has two browser windows open, one pointing to a landing page of SiteAAA.com, which is hosted on a web server ("SiteAAA web server") located in New York City, N.Y., and the other pointing to a landing page of SiteBBB.com, which is hosted on a web server ("SiteBBB web server") located in San Jose, Calif. Each web server makes an ad call to the platform when the user 12345 navigates to respective pages of SiteAAA.com and SiteBBB.com, each of which includes at least one creative serving opportunity. This has the effect of causing the advertising platform to receive two impression requests for user 12345, one from the SiteAAA web server, which gets routed to the platform's New York City data center, and the other from the SiteBBB web server, which gets routed to the platform's Los Angeles, Calif. data center. Each of the platform's data centers includes a server-side user data store that has in it a variable global-frequency associated with user-id=12345.

Suppose at time t=0, the global-frequency key-value pair of a user's impression frequency counter for user-id=12345 is "25". Traditionally with cookies, the global frequency is set to a fixed value. Synching collision occurs when two impression requests are received nearly simultaneously and a "set global-frequency to 26" notification is sent responsive to both impression requests. In other words, only one of the impression requests is logged in the user data store even though two are received. To avoid this situation, the advertising platform is implemented to send an "increment global frequency by 1" notification responsive each of the impression requests. Returning to the example above, the New York City data center will increment the global-frequency key-value pair for user-id=12345 to "26" to account for the ad call received from SiteAAA.com and transmit a message to the Los Angeles data center to apply the same logic; the Los Angeles data center will increment the global-frequency key-value pair for user-id=12345 to "27" to account for the ad call received from SiteBBB.com and transmit a message to the New York City data center to apply the same logic. In this manner, even though the messages are processed in different order on each site the final result is the same. That is, the global-frequency key-value pair for user-id=12345 goes from "25" to "27". User data store information is replicated consistently across multiple data centers.

In some embodiments, a portion of data storage of the data center 202 is designated as cookie space. Each bidder may be assigned a section of cookie space, known as a client-side user data store, in each user's browser. A bidder may freely push and pull data into or out of its own client-side user data store on each impression or pixel call. The data pushed into a particular bidder's client-side user data store is passed into requests for that bidder only, unless data contracts exist to allow the sharing of data with other bidders. However, when data is stored client-side by an advertiser outside of the user data store associated with the advertising platform provider, that data is inaccessible during an ad call, because the advertising platform domain, rather than the advertiser domain, is accessing the data forming the cookie. For this reason, data stored by the bidder is preferably stored synchronously in the client-side user data store by piggybacking a pixel call from the advertising platform.

In some implementations, user data is passed to the client-side user data store using a JavaScript Object Notation (JSON) mechanism. The advertising platform provider will execute a JavaScript function stored in each bidder's server-side context store and store the results in that bidder's section of the user's client-side user data store. Strings, integers, vectors, hash tables, and combinations of these may be stored and manipulated server side using a fully featured programming language such as JavaScript 1.8.1.

More particularly, a bidder's user data may be stored in the user's cookie as a JSON object. During a bid request, the JSON object is forwarded to the bidder. If no JSON object exists, an empty object "{ }" may be returned. The JSON object is parsed for reading using libraries provided by the advertising platform provider. Instead of creating a new JSON object to send back to the client-side user data store, a bidder includes in the bid response a call to a predefined JavaScript function stored in association with that bidder. The JavaScript function, which operates on a global variable containing the user data, is executed by the Imp Bus, and the results are stored in the client-side user data store. In some embodiments, the advertising platform provider may provide functions for use or customization.

For instance, a bidder may wish to track the number of times a creative has been shown to a particular user or the most recent time an ad was shown to that user. In response to receipt of a notification that a creative has been served, a predefined function provided by the advertising platform provider may enable frequency and recency variables associated with that user to be incremented.

In some embodiments, each data provider or bidder has its own scheme for internally identifying users. In order to enable integration between the bidder and the Imp Bus, the bidder-specific user ID for each user is mapped to the platform-specific user ID for the same user.

In general, the platform-specific user ID is stored in a client-side user data store, such as in a client-side browser cookie. The mapping between bidder user ID and platform-specific user ID may exist in the bidder's data store, the server-side cookie store of the advertising platform, or both. In some instances, the bidder's user IDs are stored within the bidder's reserved section of the client-side user data store. In this case, the bidder's user ID is included in each request the bidder receives from the Imp Bus, such as bid requests and pixel requests. In other instances, the mapping information is stored within the bidder's data store. In this case, when impression or pixel requests are received by the bidder related to a platform-specific user-id, the bidder looks up the mapping information in its own data stores.

Figure 2B:
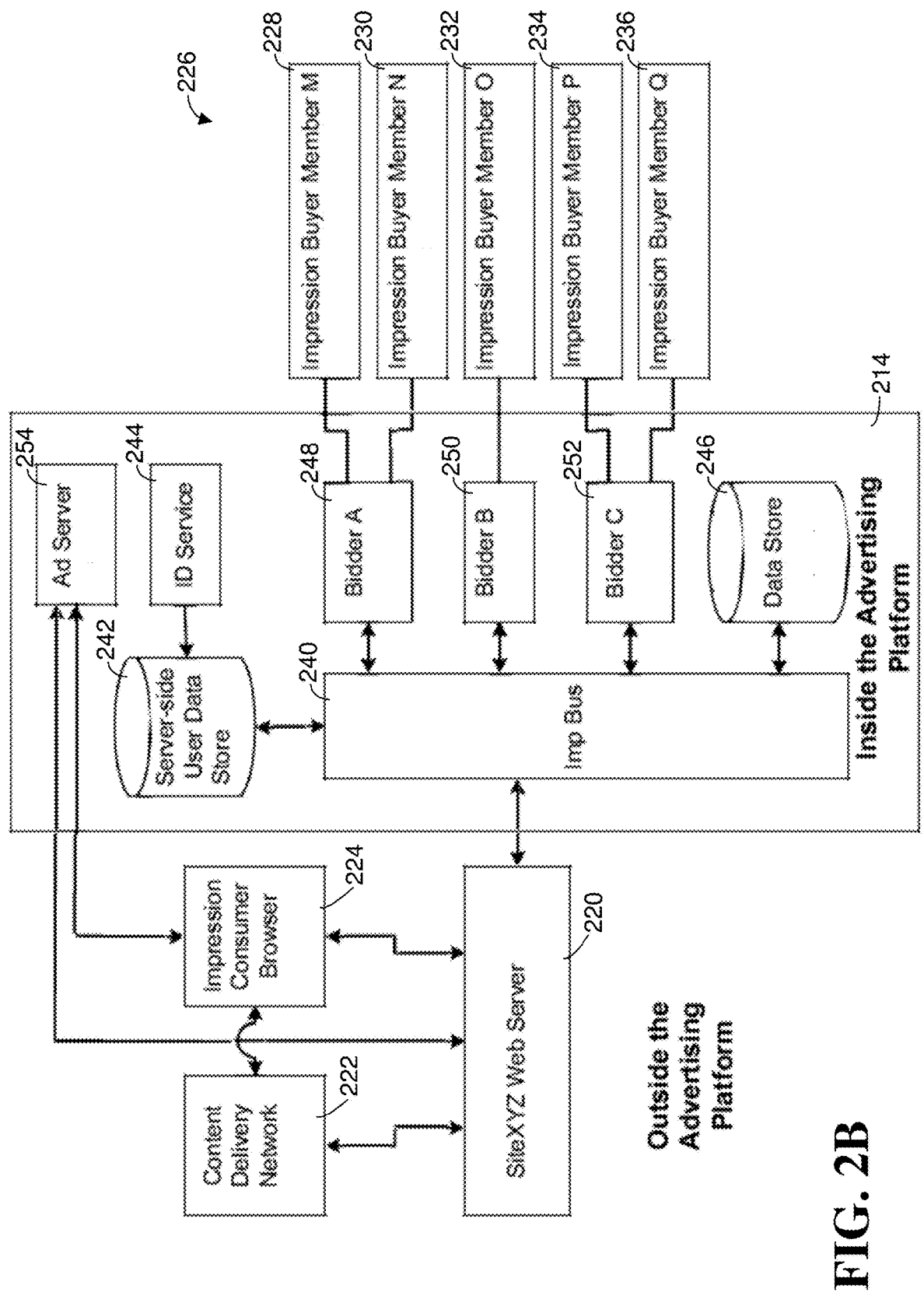
FIG. 2B is an example, non-limiting embodiment of an advertising platform functioning within the communication network of FIG. 1 in accordance with various aspects described herein.

FIG. 2B shows an exemplary embodiment of an advertising platform 214 that may be implemented, for example in a data center 202 of FIG. 1. For example, the advertising platform 214 can facilitate in whole or in part an online content delivery system which conducts an auction among bids to serve an advertisement to a web page to fill an impression. In some embodiments, the advertising platform 214 can implement a ratio pacing system to detect and compensate for unintentional bias or skew introduced in serving of content items. The advertising platform 214 is functionally illustrated in FIG. 2B in conjunction with external components including a web server 220 which implements a web site designated SiteXYZ, a content delivery network 222, a web browser 224 of an impression consumer, and a plurality of impression buyer computer systems 226. The plurality of impression buyer computer systems includes a system associated with impression buyer member M 228, a system associated with impression buyer member N 230, a system associated with impression buyer member O 232, a system associated with impression buyer member P 234 and a system associated with impression buyer member Q 236.

The advertising platform 214 includes an Imp Bus 240, a server-side user data store 242, an ID service 244, a data store 246, a plurality of bidders including bidder A 248, bidder B 250 and bidder C 252, and an ad server 254. The Imp Bus 240 or transaction management computing subsystem operates as a central control point of the advertising platform 214. The Imp Bus 240 receives creative serving opportunities such as ad calls from sources outside the advertising platform 214 including the SiteXYZ web server 220. The Imp Bus 240 generates a bid request that provides a multi-faceted characterization of each creative-serving opportunity of the requested page. The Imp Bus 240 communicates the bid request to each bidder 248, 250, 252 within the advertising platform 214. In response, the Imp Bus 240 receives one or more real-time bid responses on behalf of one or more impression buyer members 228, 230, 232, 234 236. with which the bidder 248, 250, 252 is associated. The Imp Bus 240 identifies a winning bid from among the bid responses returned by the bidders 248, 250, 252 and returns a URL that identifies a location of a creative of the winning bid to the SiteXYZ web server 220.

In exemplary embodiments, a bid request is generated by the Imp Bus 240 and generally includes information that characterizes the impression consumer or user. This information may include demographic information such as age, gender, income and race information, or geographic, psychographic and behavioral information for the user. This information may be based on data retrieved from the server-side cookie store of the server-side user data store 242, the ad space, and an auction identifier. This information may also be part of the ad call. The information about the ad space may be based on information associated with a platform-specific ad tag. In other embodiments, a bid request provided by the Imp Bus 240 to the bidders 248, 250, 252 may further include the following information:

a. Members: If included, a bidder may only consider the campaigns and creatives associated with impression buyer members having identifiers included in a Members array of information about identifiers for impression buyer members.
  b. Userdata: The userdata attached to the user's cookie owned by the bidder receiving the request.
  c. Frequency: The total number of impressions for this user across the advertising platform 214.
  d. Clicks: The total number of clicks for this user across the advertising platform 214.
  e. Recency: The number of minutes since the last impression for this user across the advertising platform 214.
  f. Session Frequency: The number of impressions in a current session for this user.
  g. Estimated Winning Bid Price: The price estimated to win the bid, based on predetermined and/or historical criteria.

A bid request can include all of this information, any combination of this information or additional information as well.

The SiteXYZ web server 220 interacts with the content delivery network 222 and the web browser 224 of the impression consumer to receive and provide information. For example, the SiteXYZ web server 220 may receive a request for a web page from the content delivery network 222, the web browser 224, or both. In return, the SiteXYZ web server 220 proves the requested web page and other date to the content delivery network 222, the web browser 224, or both.

The impression consumer web browser 224 may operate in conjunction with user equipment such as a mobile device, cellular or wireless telephone, tablet computer, laptop or desktop computer, or any other equipment that can instantiate a web browser or provide access over a network to remote equipment such as the content delivery network 222, the SiteXYZ web server 220, and the ad server 254. The impression consumer web browser 224 may include a client-side user data store. The client-side user data store stores data locally, on the device of the web browser 224 or in conjunction with the web browser. This locally stored data may include cookies or other files and data which provide information about the impression consumer, or user, associated with the web browser, including demographic information about the impression consumer.

Demographic information may include the user's age, gender, preferences, purchase history, browsing history, identification, etc. The locally stored data may further include geographic information about current or past locations of the equipment associated with the web browser 224. Any other suitable information may be stored in conjunction with the web browser 224. Similarly, any stored information may be shared by application programs or apps on the user equipment or the web browser 224 with other equipment, including the advertising platform 214.

The server-side user data store 242 stores information related to one or more users who access the advertising platform 214. For example, the server-side user data store 242 in some embodiments stores local copies of cookies and other information stored in the client-side user data store associated with the impression consumer web browser 224.

Each bidder 248, 250, 252 receives bid requests from the Imp Bus 240 in response to an impression or other advertising placement opportunity received at the advertising platform 214. The bid request includes information about the impression and invites the bidder, on behalf of one or more of the plurality 226 of impression buyer members, to develop a bid to respond to the impression. The response is in the form of a bid response provided to the Imp Bus 240. In some embodiments, a bid response includes information identifying, for example, a bid price and a creative that is to be served should the bid be identified as the winning bid of a platform-based auction.

In exemplary embodiments, a bid response typically includes a bid price and a creative that are to be served should the bid be identified as the winning bid of a platform-based auction. The actual creative may be supplied or, in the alternative, information identifying the creative or providing a location such as a URL or other network location where the creative can be found and retrieved. In other exemplary embodiments, a bid response provided by a bidder 248, 250, 252 to the Imp Bus 240 may further include the following information:

a. Member ID: This may be an identifier of the impression buyer member whose creative is chosen by the bidder 248, 250, 252 from a "Members" array of identifiers in the bid request.

b. Exclusive: This flag, which may have exemplary value of yes or no, may indicate to the Imp Bus 240 that the creative serving opportunity constitutes a pre-existing media buy and the creative provided in the bid response is to be served. No other bidders will be allowed to compete for the creative serving opportunity.

c. No bid: This flag, which may have exemplary value of yes or no, may indicate to the Imp Bus 240 that the bidder has returned a valid response but has chosen not to bid.

d. Price: The price, expressed as a cost per mille or thousand impressions (CPM), that the bidder is willing to pay for this impression. If exclusive, this is used only for reporting purposes; if not exclusive, this value may represent a reserve set by the bidder. Alternative pricing information may be provided, such as a cost-per-click (CPC) or cost-action (CPA), for example.

e. Userdata: Data to attach to the user, for example, by storing in association with the user's platform-specific user-id, if the bid response is selected as the winning bid.

f. Creative ID: Identification or location information of the advertising creative to be served if the bid response is selected as the winning bid.

g. Used Data Provider: In some embodiments, third-party data providers charge a fee when their information is used to target or optimize an ad. Contractually in such embodiments, bidders may be required to accurately report this by setting an appropriate flag in the bid response.

A bid response can include all of this information, any combination of this information or additional information as well.

The advertising platform 214 conducts an auction using bids to decide which ad creative will fill an ad call identifying an impression to be filled. The bid responses provided by the bidders 248, 250, 252 compete in an auction to determine which bid request is selected by the Imp Bus 240 for providing the creative in response to the impression or other advertising placement opportunity. The creative, or information about the creative, is provided, for example, to the SiteXYZ web server 220. In some embodiments, information about the creative selected in the auction by the Imp Bus 240 is used by the SiteXYZ web server 220 to access the creative in the ad server 254.

FIGS. 2C-2F illustrate several exemplary embodiments of operation of the advertising platform 214. In these exemplary embodiments, as in the exemplary embodiment of FIG. 2B, an impression seller member hosts a web site identified as SiteXYZ.com on SiteXYZ web server 220. The web site provides a number of creative serving opportunities, each of which is associated with a platform-specific ad tag.

A request for a page of SiteXYZ.com that is generated by an impression consumer's web browser is received at step 256 by the SiteXYZ web server 220. If the requested page includes one or more creative serving opportunities, the web server 220 makes an ad call at step 258 to the advertising platform 214 by redirecting the page request to the Imp Bus 240. The Imp Bus 240 examines a browser header of the page request to determine if a platform-specific user ID is included therein.

The following sections illustrate a number of exemplary use cases following an ad call to the advertising platform 214. Actions taken by various actors or participants within the advertising platform 214 are tagged with respective reference numerals. To minimize the repetition of textual description, in the following sections cite a reference numeral may be cited as shorthand for an action that may be taken by an actor or participant within or outside the platform. The particular use cases illustrated, and the level of detail illustrated in each use case, are intended to be illustrative only and not exhaustive. Other use cases will be evident to those of ordinary skill in the relevant art.

Figure 2C:
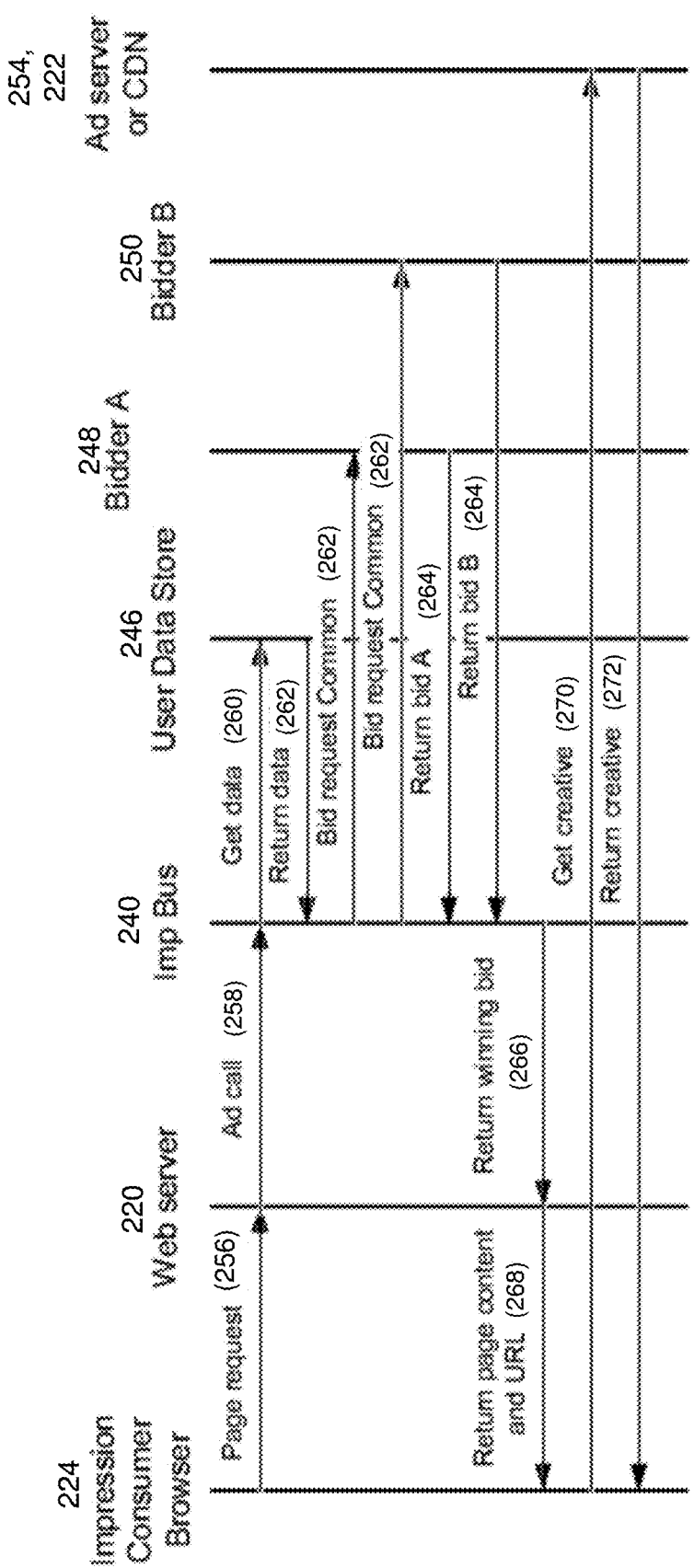
FIGS. 2C-2F illustrate several exemplary embodiments of operation of the advertising platform of FIG. 2B 1 in accordance with various aspects described herein.

FIG. 2C illustrates a first use case involving a known impression consumer, no restrictions on data sharing and an open platform-based auction. The ad call is provided from the server to the Imp Bus 240, step 258. The ad call is processed at the Imp Bus 240, for example by examining the contents of the ad call. If a platform-specific user identifier, such as User ID 1234, is found within a browser header of the ad call, the Imp Bus 240 determines the page request as originating from a known impression consumer. In response, the Imp Bus 240 retrieves at step 260 and step 262, from a server-side data store 246 within the advertising platform 214, data that has been stored in association with the platform-specific user-id.

Assume for this use case that none of the creative serving opportunities on the requested page is restricted. That is, assume the platform-specific ad tag does not specify a list of approved universal advertiser identifiers with respect to impression buyer members that may win an open platform-based auction to serve a creative. Further assume for this use case that data retrieved from the server-side data store 246 may be shared between impression trading industry members without constraints.

The Imp Bus 240, or transaction management computing subsystem, generates a bid request that provides a multi-faceted characterization of each creative-serving opportunity of the requested page. In some embodiments, there is a one-to-one correspondence between creative-serving opportunities and bid requests. That is, a bid request is generated for each ad tag associated with the requested page. In some embodiments, the multiple ad tags associated with the requested page are handled in a single bid request.

In general, a bid request includes information that characterizes the impression consumer. For example, the information included a bid request may be based on data retrieved from the server-side data store 246. Further, the information included in a bid request may include information that characterizes the ad space. For example, the information included in the bid request may be based on information associated with the platform-specific ad tag itself, such as data uniquely identifying the impression seller member, an impression inventory identifier, an impression inventory categorization identifier, or a universal impression inventory identifier; or data characterizing the impression, the impression seller member, the impression inventory source, or an impression inventory category. Still further, the information included in a bid request may include information forming an auction identifier. Because in this use case there are no constraints placed on the sharing of data between impression trading industry members, one bid request, labelled Bid request Common in the drawing, may be generated and sent to all bidders 248, 250, 252.

The Imp Bus 240 sends, at step 262 the bid request to each bidder 248, 250, 252 within the advertising platform 214. The information included in the bid request is used, at least in part, by a bidding engine of each bidder 248, 250, 252 or a decisioning processor of a decisioning subsystem to generate a real-time bid response on behalf of an impression buyer member 228, 230, 232, 234, 236 with which the bidder 248, 25, 252 is associated. Respective impression buyer members 228, 230, 232, 234, 236 may return at step 264 the bid response to the Imp Bus 240. At a minimum, the bid response identifies a bid price, determined, for instance, using optimization techniques; and a creative that is to be served should the bid be identified as the winning bid of a platform-based auction. A bidder (e.g., Bidder A 248) may be associated with multiple impression buyer members (e.g., impression buyer member M 228 and impression buyer member N 230). In such instances, the respective bidding engines implemented by the respective bidders 248, 250, 252 may be operable to conduct an internal auction using bids of the respective bid requests to identify a winning bid from among the eligible campaigns of its associated impression buyer members, and to generate a bid response for the platform-based auction based conducted by the Imp Bus 240 on the result of the internal auction.

Following return of the bid responses at step 264 by the bidders 248, 250, 252 or decisioning subsystems to the Imp Bus 240 or transaction management computing subsystem, the Imp Bus 240 identifies a winning bid. This is done within a predetermined response time period such as a period measured in milliseconds. In most instances, the winning bid is the bid associated with the highest dollar value, and the best price for a creative serving opportunity is the price that yields the highest revenue for the impression seller member. In some embodiments, the winning bid and the best price are based on other metrics, such as ad frequency. In some embodiments, if the winning bid response is associated with an ad creative that has not been approved by the impression seller member, the second-ranked bid response is selected as the winning bid.

The Imp Bus 240 at step 266 returns information that identifies a location of a creative of the winning bid to the SiteXYZ web server 220. The identifying information may be, for example, a URL. In the depicted example, the SiteXYZ web server 220 returns, step 268, to the impression consumer web browser 224, content forming the page requested at step 256. A tracking mechanism may be implemented to track presentation of the impression to the web browser 224. For example, the content forming the requested page may be embedded with an impression tracking mechanism that causes the impression consumer's web browser 224 to first point to the Imp Bus 240. This operates to allow the Imp Bus 240 to count the impression as served. Subsequently, the web browser 224 is redirected to cause the web browser 224 to retrieve, at step 270, step 272, the ad creative to be served from an ad server 254 within the advertising platform 214 or a server of a content delivery network 222. In another example, the SiteXYZ web server 220 returns to the impression consumer web browser 224 the requested page, a first URL that points to the ad creative to be served, and a second URL that points to the Imp Bus 240 for use by the Imp Bus in counting the impression as served.

Figure 2D:
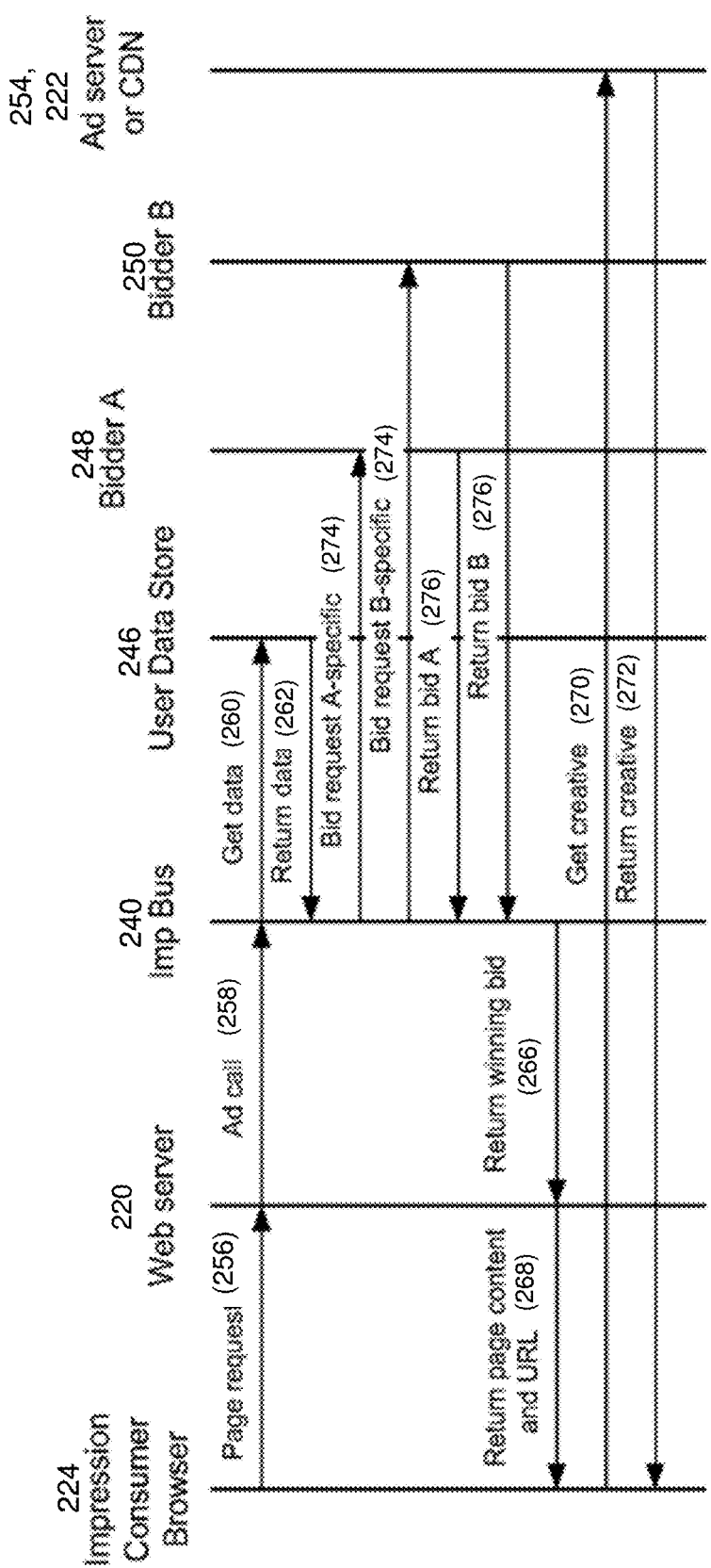

FIG. 2D illustrates a second use case involving a known impression consumer in a transaction with restrictions on data sharing in an open platform-based auction. As described above, the Imp Bus 240 receives the ad call, step 258, and fetches data from the user data store, step 260, step 262. In this use case, assume that restrictions have been placed on the sharing of data retrieved from the server-side data store 246 between some of the impression trading industry members. For each impression trading member, the Imp Bus 240 examines the restrictions to identify the subset of data retrieved from the server-side cookie store that may be shared with that impression trading member. For each creative serving opportunity of the requested page, the Imp Bus 240 generates an impression trading member-specific bid request. In the exemplary embodiment of FIG. 2C, these are labelled Bid request A-specific and Bid request B-specific. The specific bid requests provide a multi-faceted characterization of a creative serving opportunity. In general, the specific bid request of step 274 includes information that characterizes the impression consumer, the ad space and an auction identifier. The information that characterizes the impression consumer may include information based on the subset of data retrieved from the server-side cookie store that may be shared with that impression trading member. The information about the ad space may be based on information associated with the platform-specific ad tag itself.

At step 274, the Imp Bus 240 sends the appropriate bid request to each bidder 248, 250, 252 within the advertising platform 214. The advertising platform 214 acts on the bid requests in a manner similar to that described above. At step 276, the advertising platform 214 returns bid responses to the Imp Bus 240. At step 266, the Imp Bus 240 conducts an auction and identifies a winning bid from among the bid responses returned at step 276 by the bidders 248, 250, 252. At step 268, the Imp Bus 240 returns a URL that identifies a location of a creative of the winning bid to the SiteXYZ web server 220. Step 268, step 270 and step 272 are performed as described above to effect the delivery of an ad creative.

Figure 2E:
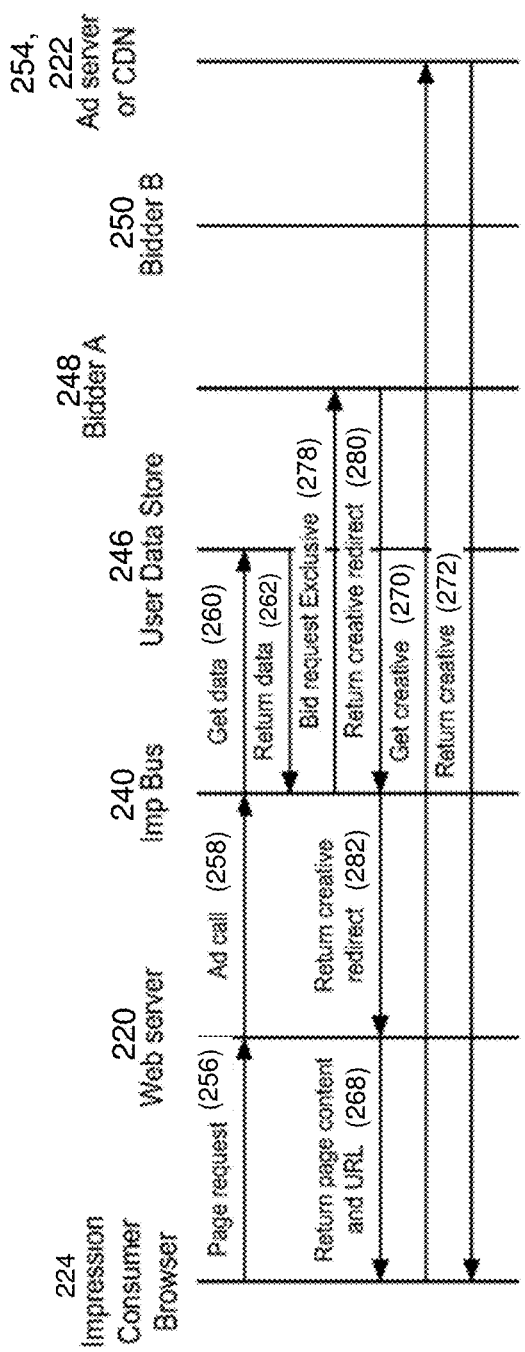

FIG. 2E illustrates a third use case involving a known high value impression consumer and no platform-based auction. This use case may occur when an impression buyer member has purchased a media buy giving exclusive access to a particular market, keyword or other portion of the advertising space. In this example, Impression Buyer Member O 232 has purchased an exclusive media buy.

As described above, the Imp Bus 240 receives the ad call, step 258, and fetches data from the user data store, step 260, step 262. The Imp Bus 240 examines each platform-specific ad tag found within the browser header of the ad call to determine whether the corresponding creative serving opportunity on the requested page is part of a particular impression buyer member's pre-existing media buy. For each creative serving opportunity on the requested page that is part of an impression buyer member's pre-existing media buy, the Imp Bus 240 generates a bid request-exclusive that provides a multi-faceted characterization of that creative serving opportunity. At step 278, the Imp Bus 240 sends the bid request-exclusive to a bidder such as Bidder B 250 in the illustrated example. The bidder, Bidder B 250, operates within the advertising platform 214 on behalf of that particular impression buyer member, in this example, Impression Buyer Member O 232.

The bidder, bidder A 248, that receives the bid request examines the information that characterizes the impression consumer to determine the value of the impression consumer to the impression buyer member, in this example, Impression Buyer Member O 232. Impression Buyer Member O 232 is the impression buyer for whom the creative serving opportunity constitutes a pre-existing media buy. If the value of the impression consumer exceeds a predetermined threshold, the bidder (in this example, bidder A 248) selects a creative from a campaign associated with the impression buyer member, Impression Buyer Member O 232, for whom the creative serving opportunity constitutes a pre-existing media buy, and returns, step 280 to the Imp Bus 240 a redirect identifying the location of the selected creative. The Imp Bus 240 sends at step 282 this redirect to the SiteXYZ web server 220. Step 268, step 270 and step 272 are performed as described above to effect the delivery of an ad creative.

Figure 2F:
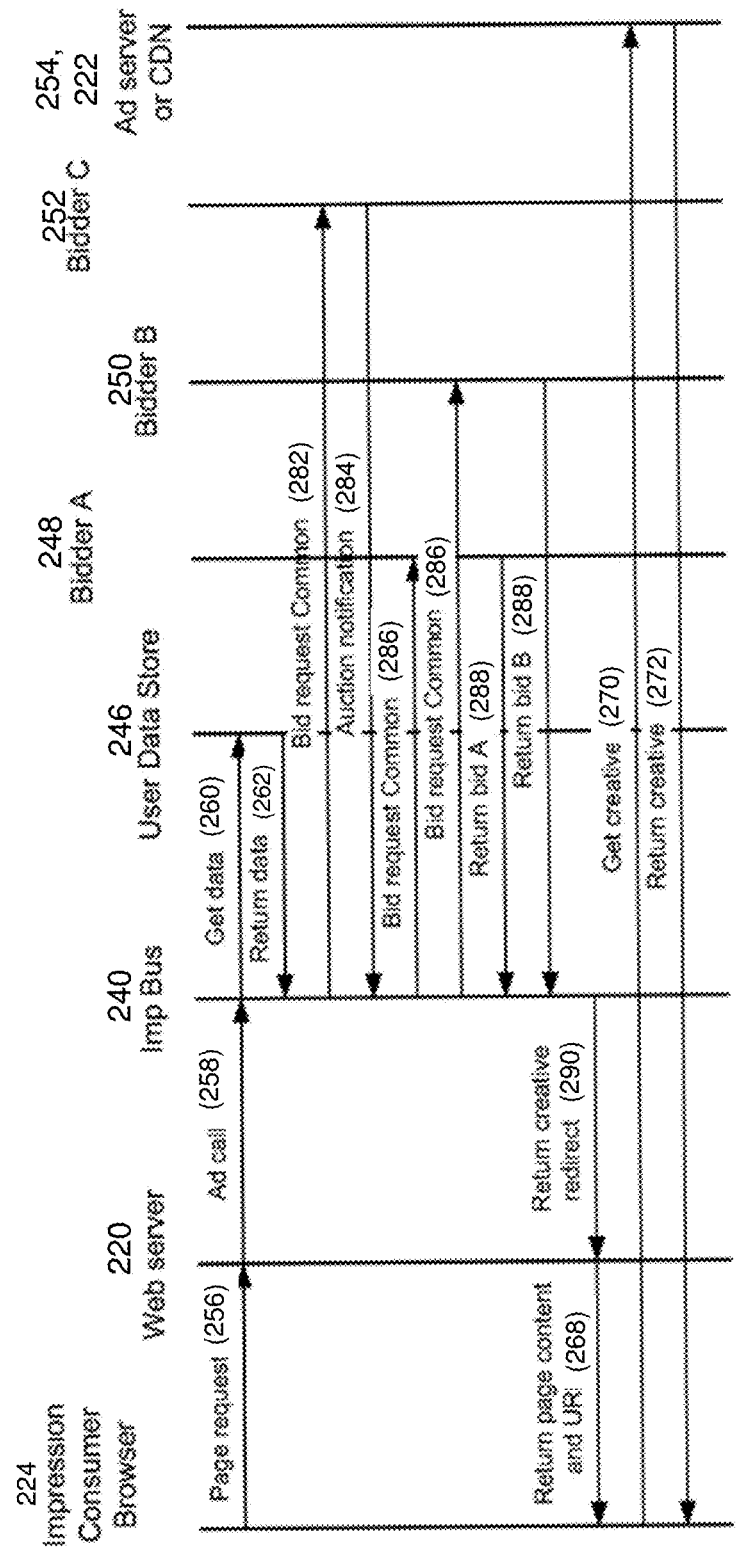

FIG. 2F illustrates an alternative use case involving a known low value impression consumer, no restrictions on data sharing and a constrained platform-based auction. In FIG. 2F, the Buyer member Q 236 has made a pre-existing exclusive media buy. As described above, the Imp Bus 240 receives the ad call, step 258, and fetches data from the user data store, step 260, step 262. In this example, data retrieved from the server-side data store 246 may be shared between impression trading industry members without constraints.

The Imp Bus 240 examines each platform-specific ad tag found within the browser header of the ad call received at step 258 to determine whether the corresponding creative serving opportunity on the requested page is part of a particular impression buyer member's pre-existing media buy. For each creative serving opportunity on the requested page that is part of an impression buyer member's pre-existing media buy, the Imp Bus 240 generates a bid request, designated as a Bid request Common in FIG. 2F, that provides a multi-faceted characterization of that creative serving opportunity and at step 282 directs that bid request to the bidder. In the exemplary embodiment of FIG. 2F, the bid request is directed to Bidder C 252. Bidder C 252 is operating on behalf of a particular impression buyer member, in this example, Impression Buyer Member Q 236. In general, the bid request sent at step 282 includes information that characterizes the impression consumer, the ad space and an auction identifier. The information that characterizes the impression consumer may be based on data retrieved from the server-side cookie store. The information that characterizes the ad space may be based on information associated with the platform-specific ad tag itself.

The bidder (in this example, Bidder C 252) that receives the bid request examines the information that characterizes the impression consumer to determine the value of the impression consumer to the impression buyer member, Impression Buyer Member Q 236 for whom the creative serving opportunity constitutes a pre-existing media buy. If the value of the impression consumer does not exceed a predetermined threshold, the bidder returns at step 284 to the Imp Bus 240 an auction notification. In one example, the auction redirect includes a redirect that identifies a location of a reserve creative and a reserve price that other bidders must meet in order to take the creative serving opportunity away from the impression buyer member, Impression Buyer Member Q 236 for whom the creative serving opportunity constitutes a pre-existing media buy.

Because in this exemplary use case, there are no constraints placed on the sharing of data between impression trading industry members, the Imp Bus 240 may send at step 286 the previously-generated bid request, to each of the other bidders, in this example, Bidder A 248 and Bidder B 250, within the advertising platform 214. At step 286, the Bid request Common is now considered a secondary bid request. Each of Bidder A 248 and Bidder B 250 examines the information that characterizes the impression consumer to determine the value of the impression consumer to its associated impression buyer members. In this example, Bidder A 248 is associated with Impression Buyer Member M 228 and Bidder B 250 is associated with Impression Buyer Member O 234. In some embodiments, each of Bidder A 248 and Bidder B 250 generates a bid response to be returned at step 288 to the Imp Bus 240.

The Imp Bus 240 first eliminates from contention those bid responses having a bid price that fails to meet or exceed a reserve price included in the auction notification received at step 284. If all of the returned bid responses are eliminated, the Imp Bus 240 sends at step 290 the redirect that was included in the auction notification to the SiteXYZ web server 220. If, however, at least one of the returned bid responses meets or exceeds the reserve price included in the auction notification, the Imp Bus 240 performs an auction, identifies a winning bid, and returns at step 290 to the SiteXYZ web server 220 a redirect that identifies a location of a creative of the winning bid. Steps 268, 270, 272 are performed as described above to effect the delivery of an ad creative.

In one example, the impression buyer member Impression Buyer Member Q 236 corresponds to an advertising agency and the creative serving opportunity on the requested page is part of the impression buyer member's pre-existing media buy for a first advertiser or advertising network that engaged the advertising agency. The advertising agency may choose to have its bidder, Bidder C 252, conduct an internal auction to identify a winning bid among the eligible campaigns of the other advertisers and advertising networks associated with the advertising agency in those instances in which the value of the impression consumer to the first advertiser or advertising network does not exceed a predetermined threshold. Only if the winning bid resulting from the internal auction does not meet a reserve price set by the first advertiser or advertising network for that creative serving opportunity does the bidder, Bidder C 252, return to the Imp Bus 240 an auction notification as described above.

At the conclusion of a platform-based auction, the Imp Bus 240 may generate a result notification for each bidder 248, 250, 252 that submitted a bid response responsive to a bid request. The information included in a result notification may vary depending upon implementation and circumstance. Examples of such information include the following:

a. Auction ID: An auction identifier that uniquely identifies this particular auction from among all of the platform-based auctions that have taken place within the platform.

b. Transaction ID: A transaction identifier that uniquely identifies a transaction in the auction.

c. Valid Bid: This flag, which may be binary and set to either yes or no, reports to the bidder the receipt of a valid bid response.

d. No Bid: This flag, which may be binary and set to either yes or no, reports to the bidder the receipt of a no-bid response.

e. Impression Won: This parameter notifies the bidder as to whether its bid response resulted in a winning auction and impression served.

f. Impression Won/Deferred: This parameter notifies the bidder that its bid response resulted in a winning auction but serving of its impression is being deferred.

g. Winning Price: This value represents the bid price that won the auction. In some implementations, this parameter is excluded if the reserve price specified by the impression seller member is not met.

h. Bid Price: This value represents the bid price submitted by the bidder in this particular auction.

i. Estimated Winning Bid Price: This value represents a price that was estimated to win this particular auction, based on predetermined and/or historical bid data.

j. Member ID: This value identifies the impression buyer member for whom the bidder operated on behalf of in this particular auction. Typically, this value is provided to the Imp Bus in the bidder's bid response.

k. Bidder ID: This value identifies the bidder used in this particular auction.

l. Response Time: When provided, this value represents the number of milliseconds that elapsed between the sending of a bid request to a bidder and the receipt of a bid response from that bidder. This parameter is excluded if no bid response is received by the Imp Bus.

m. Revenue Generated: This value represents revenue generated by the sale of an impression.

n. Impression Consumer: This parameter reports information associated with the impression consumer or the impression consumer's web browser.

o. Impression Consumer's Response: This parameter reports information associated with the impression consumer's response to a creative that was served.

p. Impression: This parameter reports information associated with the impression or advertising space.

q. Creative: This parameter represents or characterizes the creative selected to be served.

r. Ad Tag: This parameter includes information associated with the ad tag.

s. Third-party ID: This parameter identifies any third-party data providers that contributed data towards the generation of a bid response.

The result notification may include other, additional or less information, depending on a particular embodiment, implementation or use case. The result notification maybe presented or communicated in any suitable fashion, such as a message with a number of designated, formatted fields for each item of information. The information provided in the result notification may be used by a bidder 248, 250, 252 or decisioning subsystem to fine tune or otherwise modify its bidding strategy to better position itself to win future platform-based auctions. Suppose, for example, that a bidder consistently loses a platform-based auction with a bid of $2.00 for a car buyer on a particular website such as nytimes.com/autos. By examining the Winning Price information provided in the result notification, the bidder may adjust a future bid price to maximize its potential to win such a platform-based auction without overpaying for the impression. Similarly, by examining the Response Time information provided in the result notification, the bidder may determine that its bid response is being received outside of the predetermined response time period set by the Imp Bus 240 and adjust its bidding algorithm to accelerate the rate at which its bid response is generated and returned to the Imp Bus 240. Such adjustments may be made automatically after receipt and processing of the result notification, or manually by a campaign manager, or a combination of these.

A bidder can also pass to the Imp Bus 240 or transaction management computing subsystem additional information such as a user ID, a user frequency, a campaign ID, or others, to be passed back to the same bidder during a result notification. This additional information can also be useful to the bidder or to the impression buyer member to manipulate bidding strategy or to understand the results of an ad campaign.

From the advertising platform provider's standpoint, there are advantages to preventing impression trading industry members from obtaining detailed information about any one particular impression consumer or creative serving opportunities within the platform. For example, this minimizes the potential for an impression trading industry member to sign up to transact on the platform for a short period of time simply for the purposes of obtaining detailed information about impression consumers and quitting after a sufficient amount of detailed information has been obtained. To that end, the Imp Bus 240 may be configured to filter the information that is passed between the various impression trading industry members during the course of transaction platform-based auctions.

The use case illustrated in FIG. 2D illustrated a scenario in which restrictions have been placed on the sharing of data retrieved from the server-side cookie store between some of the impression trading industry members. In this use case, for each impression trading member, the Imp Bus 240 examines the restrictions to identify the subset of data retrieved from the server-side user data store 242 that may be shared with that impression trading member. The Imp Bus 240 generates an impression trading member-specific bid request that includes information that characterizes the impression consumer. The information may be based on the subset of data retrieved from the server-side cookie store that may be shared with that impression trading member, for example.

In an alternative embodiment, the Imp Bus 240 or transaction management computing subsystem may also filter the information that is retrieved from the cookie store. In one embodiment, the Imp Bus 240 analyzes the entirety of the data retrieved from the server-side user data store 242 or user data store 246 and provides a somewhat abstracted version of the retrieved data in each impression trading member-specific bid request.

In one example, the retrieved data includes information about the impression consumer's gender, age, zip code, income, and behavioral data. Also in this example, bidder A 248 previously pushed information into the server-side user data store 242 to identify this particular impression consumer's gender (gender=male), income (income=$138,000), and behavioral data (behavioral data=likes fishing, likes hunting) only; bidder B 250 previously pushed information into the cookie store to identify this particular impression consumer's age (age=28), zip code (zip code=02130), and behavioral data (behavioral data=buys ski gear) only; bidder C 252 has never pushed information into the cookie store with respect to this impression consumer. Other information in the user data store 246 may have been provided by a third-party data provider, an impression buyer member, and/or an impression seller member.

The respective bid requests generated by the Imp Bus 240 may be tailored to the data provided by each respective bidder. For bidder A 248, the Imp Bus 240 may generate an impression trading member-specific bid request that includes gender=male, age=25-35; zip code=North East USA; income=$138,000, and behavioral data=likes fishing, likes hunting, likes winter sports. For bidder B 250, the Imp Bus 240 may generate an impression trading member-specific bid request that includes gender=male, age=28; zip code=02130; income=$100,000-$199,999, and behavioral data=likes outdoor sports, buys ski gear. For bidder C 252, the Imp Bus 240 may generate an impression trading member-specific bid request that includes gender=male, age=25-35; zip code=North East USA; income=$100,000-$199,999, and behavioral data=likes outdoor sports, likes winter sports. Each bidder is provided detailed information that it has itself pushed to the cookie store via a feedback mechanism through the platform but is only provided an abstracted version of the remaining information that is retrieved from the cookie store.

In addition to providing an abstracted version of the data retrieved from the cookie store, the Imp Bus 240 may also provide an abstracted characterization of the creative serving opportunity. For example, in lieu of specifying the URL of the page being requested (e.g., lodgeatvail.rockresorts.com/info/rr.gcchalet.asp) by the impression consumer's web browser, the Imp Bus 240 may simply provide in the bid request an identifier of a category of the page and site, such as high-end ski resort. More generally, the Imp Bus 240 may provide data characterizing an impression, an impression seller member, an impression inventory source, and/or an impression inventory category. In some embodiments, the Imp Bus 240 sends a data retrieval request to an inventory management subsystem operable to manage impression inventory information across multiple impression inventory sources. One example of a scenario in which it is advantageous to obfuscate the creative serving opportunity is as follows. A publisher has a sales force that is tasked with identifying impression buyer members with which to establish a contractual relationship that defines a media buy. An impression buyer member that is aware of the opportunity to obtain this publisher's impression inventory at a lower price through platform-based auctions may choose to bypass the publisher's sales force altogether and take its chances on the open market. This has the effect of reducing the number of media buys that are established between the publisher and the impression buyer member and/or altering the financial worth of the media buy from the publisher's perspective.

In some embodiments, the Imp Bus 240 may provide data uniquely identifying the creative serving opportunity, including data uniquely identifying an impression seller member, an impression inventory identifier, an impression inventory categorization identifier, a universal impression inventory identifier, and/or a universal resource locator.

An important feature of online advertising is the ability of advertisers to address the right audience by grouping online users in audience segments. These segments are used by marketers, ad traders, and campaign managers to deploy personalized ad targeting. While there have been a number of works that proposed new methods to best combine users into segments, there have been little to no work on how to actually improve targeting performed by campaign managers on continuously shifting online audiences. Despite the substantial expenditure on online ads, much campaign targeting is still done manually. Use of better audience recommendation systems would allow marketers to improve the returns on the millions of dollars per year that are invested in advertisement campaigns.

FIGS. 3A-3D illustrate aspects of an audience recommender system and method which is based on a neural embedding model. The system and method learn from the combined knowledge aggregated from a sample of campaign configurations on the a commercially available online platform. The system and method help marketers to enrich their audiences by suggesting similar segments from a large segment pool available. To this end, some embodiments of the system use the GloVe algorithm to learn segment embeddings and use a K-Nearest Neighbor model to provide recommendations. The GloVe algorithm refers to machine learning algorithms for obtaining vector representation for words using Global Vectors for Word Representation. Some embodiments include a complete pipeline that can be easily modified to support other recommendation problems. Extensive offline tests of the embedding models show the effectiveness of models and the impact of various tuning strategies to customize the models for particular use-cases.

Recommender systems have seen an increase in the use of Machine Learning in the past two decades. Specifically, item relevance ranking is a task that has benefited from the large amount of interaction data between users and items on web and mobile platforms. Depending on the platform, ranking algorithms need to optimize for custom metrics. Recently, two-sided marketplaces have evolved as sustainable business models, however, most of the existing literature still focuses on optimizing one-sided metrics. For two-sided marketplaces both sides of each transaction (i.e. sellers and buyers) need to be optimized.

In one exemplary advertising exchange, each advertiser campaign is set up and managed by ad-traders and can be attached to a set of segments. A segment is a set of online users that describes the interests and characteristics of a particular online audience. The lifecycle of a segment is an interesting departure from the traditional recommendation systems static datasets, due to the ever-shifting nature of online audiences. This provides challenges and incentives to the segment providers to deliver high quality, coherent, and timely segments, which represent with high fidelity the interests and other characteristics of the targeted online users. This in turn allows the advertiser to customize their ad personalization, and only bid on inventory that matches the type of audience that the advertiser is looking to reach. By providing recommendation tools to publishers, advertisers, and segment providers, these entities can benefit and drive the virtuous cycle of advertisement personalization.

The problem may be framed from the side of an advertiser's campaign manager. The campaign manager faces an important technological decision: Based on a list of segments that are already attached to a campaign, how do I select more segments that represent the audience that I am trying to reach?

Some embodiments use similarity technique referred to as Seg2Vec. One goal of the system and method is to be able to compute efficient similarity metrics between segments so that the system and method can recommend the closest relevant segments based on a set of segments that the trader provides. Note the emphasis on a set of segments as a starting point rather than a single segment. This is primarily to allow the campaign manager or trader to combine segments at a conceptual level. For example, if we have two segments "car enthusiast" (i.e. interested in buying/renting a car) and "new parent," the traditional approach of discrete set membership is one existing method to merge these two concepts. However, a system or method in accordance with some features disclosed here extracts a machine-readable representation (i.e. Embeddings) that allows, in a sense, to do a form of Segment Algebra, and to be able to combine the two concepts in learned, denser, lower-dimensional embedding spaces. This method allows the system and method to provide more meaningful recommendations that would be missed using traditional discrete set membership methods.

Figure 3A:
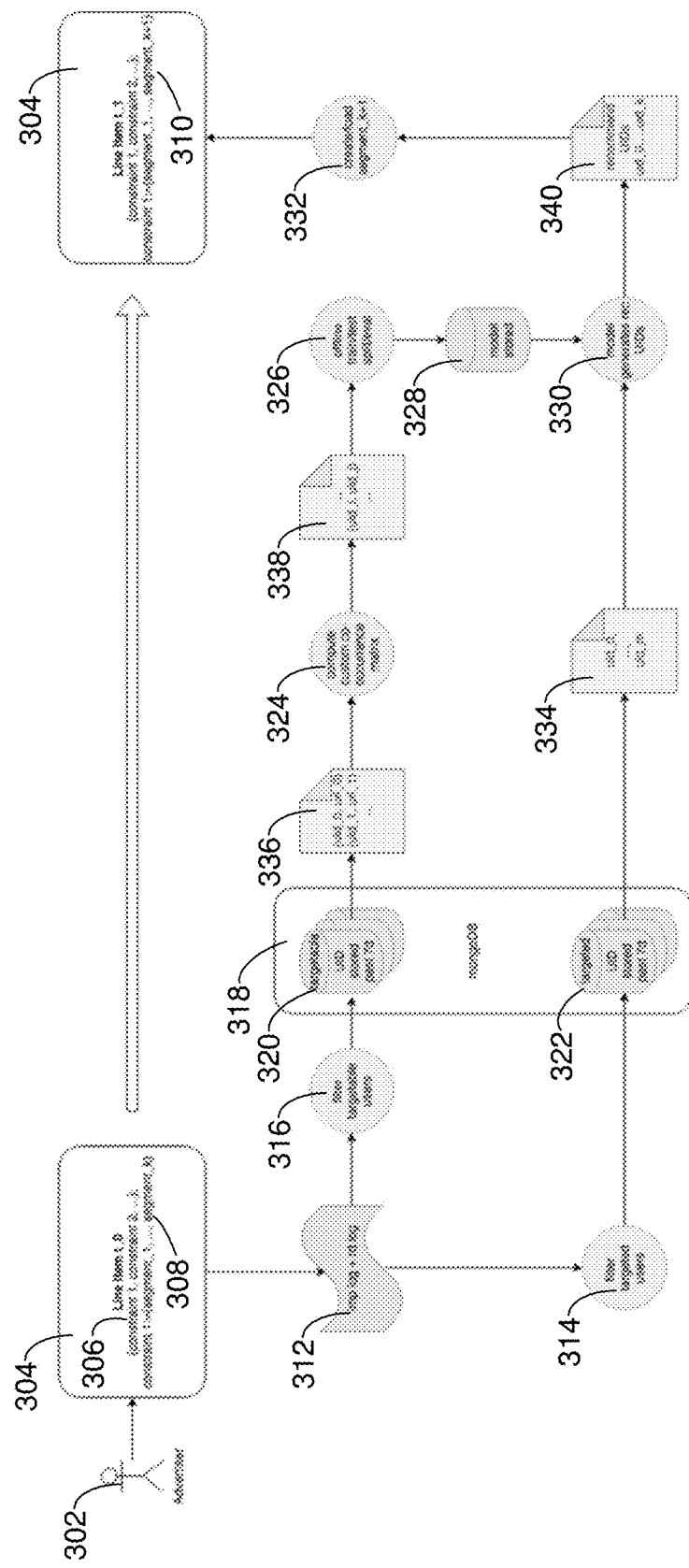
FIG. 3A is a block diagram illustrating an exemplary, non-limiting embodiment of a system for line item-based audience extension for an online advertising campaign in accordance with various aspects described herein.

FIG. 3A is a block diagram of a system 300 for managing advertisement delivery for an online advertising campaign. An advertising campaign may be characterized by, for example, a campaign identifier, one or more keywords, advertising text, an advertiser identifier, a landing page identifier such as a uniform resource locator (URL), a campaign budget, campaign timing information, etc. A campaign has specified goals for delivery of advertisements, a budget and a time duration. A campaign specifies an audience for the campaign including one or more audience segments. During the duration of the campaign, it may occur that the campaign is falling short of its delivery goals. That is, not enough impressions are being filled by the advertisements of the campaign and it may appear that the entire budget may not be spent during the campaign. Embodiments in accordance with features disclosed herein provide for extending the audience of the campaign by automatically identifying and adding one or more audience segments to the campaign to adjust campaign delivery to better meet campaign delivery goals.

In an embodiment, the audience extension process is enabled by a campaign manager. In some embodiments, it may be enabled on a line item basis, rather than for all line items of an advertiser or campaign manager. The term line item may be used interchangeably with the term campaign. Enabling audience extension may be done by a manual adjustment or change to campaign parameters or by an automatic detection and activation of the audience extension process. Once the process is initiated on an online advertising delivery system, the system identifies targetable users that match constraints of the line item. The system then begins collecting user browsing history for the identified targetable users. The browsing history may include, for example, information about web sites visited by respective users. Based in part on the browsing history, the system generates a model to rank the targetable users and then builds a new audience segment based on some of the ranked targetable users. In one example, the top N ranked targetable users are selected and combined into the new audience segment, where N is any suitable number. The system then attaches the new segment to the line item and begins targeting users of the new segment, along with users of previously attached segments of the line item. In this manner, more users are available to receive impressions of the line item and the delivery of impressions can be better controlled to match the delivery goals of the campaign and line item.

In implementing the model, the system employs a model training algorithm. This algorithm in some embodiments may include collecting information identifying targetable users for the line item. The collected information may be filtered into data pairs identifying a user and a Uniform Resource Locator (URL) visited by the user. A co-occurrence value may be computed for users based on the URLs visited by the users. The model may be a machine learning model and may be trained with the user-user co-occurrence pairs and stored for subsequent use. In some embodiments, one-hot encoding is used to form the model. In other embodiments, the model may be a trained embedding space. Where a large amount of data is used, such as many users and many URLs, encoding the data using an embedding space may be preferred. The embedding reduces the amount of data processing required by knowledge compression. Training the model may occur on any appropriate basis, such as once per week. Preferably, the training occurs in a batch process, offline. Once trained, the model may be loaded to or added to the system 300 for online use. As new data is received, such as by the process 312, the model may be updated.

Next, the targeted audience may be projected into the trained embedding and an average of the targeted audience in the embedding may be computed. Based on a distance from the average in the embedding, the targetable users may be ranked against each other. Based on the ranking, a top group of users, such as N top ranked users, may be extracted and the new audience segment created including the extracted users. The extracted users and the new segment may be attached to the line item, such as by uploading information about the audience segment through an application programming interface (API) batch segment service.

A system and method in accordance with features disclosed herein can improve advertising delivery for advertiser line items by extending the audience automatically during a campaign. The disclosed system and method leverage deep learning to identify users that are behaviorally similar to users explicitly targeted by a line item. In some applications, delivery is directly dependent on the size of the line item's targeted audience. The disclosed system and method expand the targeted audience for a line item with users that are analogous to those originally targeted by the line item, thus helping to meet delivery goals.

Given a set of advertisement campaigns $C=\{c_1, \ldots, c_{|C|}\}$, and a set of segments $S=\{s_1, \ldots, s_{|S|}\}$, the system and method will retrieve segments that are most similar to other sets of segments. This requires a similarity metric between segments. The system and method extract this similarity metric by embedding the segments in a learned dense low dimensional space using the relationship between the campaigns and the segments.

To quantify the relationship between a pair of segments $(s_i, s_j)$ the system and method use the Boolean co-occurrence of a segment $s_i$ with segment $s_j$ on a campaign $c_i$ based on an internal dataset. Using this cooccurrence matrix X, the system and method perform item-level collaborative filtering (CF). The system and method operate at the level of sets of items rather than at the level of sequences of words. Let $\hat{y}_{sj}^{si}$ be the co-occurrence Boolean value, and $\hat{y}_{s_i}^{s_j}$ be the predicted relevance between the two segments. To estimate the relevance score the system and method use a model $M(s_i, s_j, \theta) = \hat{y}_{sj}^{si}$ defined by the parameters $\theta$. The optimal model parameter set $\theta^*$ is extracted using the following optimization target:

$$\theta^* = \operatorname*{argmin}_{\theta} \sum_{s \in S} \mathcal{L}^R(\hat{y}^{si}, y^{si}).$$

This work focuses on implicit binary relevance labels and uses a point-wise loss. The system and method may employ the negative log of the likelihood function to obtain the following formulation $$\mathcal{L}^R(\hat{y}, y) = -\left[\sum_{s \in D_p} \log(P(X(i,j)=1 \mid \hat{y}_s)) + \sum_{s \in D_n} 1 - \log(P(X(i,j)=1 \mid \hat{y}_s))\right],$$

where $D_p$ is a set of positive pairs of segments $(s_i, s_j)$ which occur on the same campaign in the co-occurrence matrix X, and $D_n$ is obtained with negative sampling a set of random segment pairs $(s_i, s_j)$ that are randomly sampled from the entire segments set S. In the present case, to represent the log of the sigmoid of the dot product of the embedding vectors of segments i and j the system and method use the following:

$$P(X(i,j) = 1 \mid \hat{y}_s) = \log \frac{1}{1 + e^{u_{s_i} u_{s_j}}},$$

where $u_{s_i} \in R^d$ is the d-dimensional embedding vector of each unique segment $s_i \in S$. One goal is to learn this representation, that places similar segments nearby in the embedding space.

One exemplary neural network architecture that may be used in accordance with some embodiments is a log bilinear model with a shared embedding layer between each pair of segments. In addition to the embedding layer, the system and method may add a bias component.

After training this neural network, the system and method in the exemplary embodiment extract the embedding vectors for all the segments and train a k nearest neighbor (K-NN) model using cosine distance, to pre-build a faster lookup method at prediction time.

FIG. 3A shows a system 300 for automatically extending an audience for a line item 304 of an advertiser or campaign manager 302 by adding one or more audience segments. The process includes a data collection process 312, a targeted user filter 314, a targetable user filter 316, a database 318 including a targeted user data store 320 and a targetable user data store 322, a matrix computing process 324, an offline training process 326, model storage 328, user recommendation process 330 and segment creation process 332.

An advertiser or campaign manager 302 sets up an advertising campaign. The campaign here corresponds to or may be referred to as a line item 304. The line item 304 includes identifying information, such as Line item t_0, where the t_0 suffix refers to timing at a first timing point t=t_0. The line item 304 includes one or more parameters in the form of constraints 306. The line item 304 includes a constraint 1 that specifies a number of segments 308. The campaign manager 302 wants to deliver ads to segments 306 for the line item 304. Here, line item 304 is associated with k segments 306, from a first segment labelled segment_1 through a last segment 308 labelled segment_k. In one aspect in conjunction with features disclosed herein, the system and method will automatically identify or form new segment 310, labelled segment k+1 to improve delivery of ads for the line item 304. The campaign manager 302 may be an individual or in some embodiments may be an automated process. In the automated process, one or more of the decisions or inputs made by the campaign manager are done based on a computer analysis or automated determination rather than based on human analysis and human determination, or by a combination of human interaction with an automated process. A human campaign manager operates a campaign manager device such as a computing device or system for data entry, data processing and data communication. The campaign manager device communicates data with other devices over one or more networks.

The data collection process 312 collects information about the line item 304. For example, the data collection process may receive information about the line item from server side user data store 242 (FIG. 2B) when an impression is received by the advertising platform 214. In this way, it might not be required for this impression to be explicitly bought and served by a line item. Rather, it might be enough for this impression to be "seen" by this line item. Information may include impressions, browser information, websites visited, cookie identifiers, etc. The information may be collected over a predetermined time period, such as seven days or since the campaign began. Any other type of useful information may be collected, and any suitable time period may be set for data collection. Such information may be considered as a number of discrete events. In one example, for an impression, information collected by the data collection process 312 includes identification information for a user who viewed the impression, identification information for the advertisement viewed or line item viewed, etc. In an example, the data collection process receives data in the format line item identifier, user identifier and inventory URL identifier. The line item identifier uniquely identifies the line item 304 or any other line item. The user identifier uniquely identifies the user viewing the impression, such as on a web page requested by the user. The URL identifier uniquely identifies the web page requested or viewed by the user. Any event associated with the line item 304 is collected by the data collection process 312.

The targeted user filter 314 filters or selects information from the data collection process 312 that pertains to targeted users. The targeted user filter 314 identifies events associated with the line item 304 and stores some or all of the data associated with the event. For example, the targeted users filter 314 may store a user identification for the user who viewed the impression. The user identification information may correspond to respective web browsers associated with a particular user meeting demographic, geographic, psychographic and behavioral characteristics targeted by the line item. The targeted user filter 314 stores the information for the event detected by the data collection process 312 for a targeted user in the targeted user data store 322. The targeted user data store 322 in one exemplary embodiment stores a list 334 of targeted user identifiers uid_0, . . . uid_m. This corresponds to a list 334 of user identifiers that the campaign manager 302 actually wanted to target for the line item 304. Thus in FIG. 3A, users uid_0 . . . uid_m were found in one or more of the segments segment_1 . . . segment_k.

In some embodiments, to expand the audience for the line item 304, the system and method of the subject disclosure operate to expand the targeted user list 334 by adding to the targeted user list 334 other user identifiers that correspond to users who are similar in nature to the users associated with users uid_0 . . . uid_m of the targeted user list 334. This can be done using marketplace data to collect user identifiers that are referred to as targetable user identifiers. Marketplace data might also include cross-device user data.

Targetable user identifiers may be identified by any suitable means. In some embodiments, targetable users are identified based on, for example, a user browsing history. In some embodiments, a targetable user filter 316 of the system 300 monitors browsing history of all users and stores information about the browsing history in the targetable user data store 320. The stored information may include any suitable information such as a user identifier for the user or his web browser, information about web pages visited such as URL information, browser cookie information, etc. The stored information may be collected for any suitable time period such seven days or since the inception of the campaign including the line item 304.

In some embodiments, the system 300 produces a targetable user list 336 from information contained in the targetable user data store 320. The targetable user list 336 includes information about users whose browsing activity has been tracked by the system 300. The users may include targeted users on the targeted user list 334. The targetable user list 336 may include any suitable information about targetable users, including user identification information and identification information such as URL information about websites visited by the users. In one embodiment, the targetable user list 336 includes a set of pairs of user identifiers and web site identifiers, (uid_0, url_0), (uid_1, url_1) . . . .

The targetable user list 336 is provided to the matrix computing process 324. The matrix computing process 324 computes a co-occurrence matrix 338. User pairs are stored within the co-occurrence matrix 338 if the two users have a URL in common. Thus, in the example of FIG. 3A, the user having uid_i and the user having uid_j share a common URL or other browsing history information.

For some datasets, the co-occurrence matrix 338 may be very large in size. Its size is essentially the square of the targetable user list 336 which tracks browsing activity for a large number of users. Because of the potentially large size of the co-occurrence matrix 338, deterministic methods for analyzing the matrix may be inefficient. Accordingly, a non-deterministic or machine learning technique may be preferred for calculating the relationship between two users.

The offline training process 326 accesses the co-occurrence matrix 338 and builds a model which can efficiently and non-deterministically determine a strength of a relationship between two users in the co-occurrence matrix 338 and to make predictions from the targeted user list 334. The model can be used to rank targetable users. The targetable users can then be used to build a new audience segment for targeting advertisements. The new segment can then be attached to the line item 304.

Figure 3B:
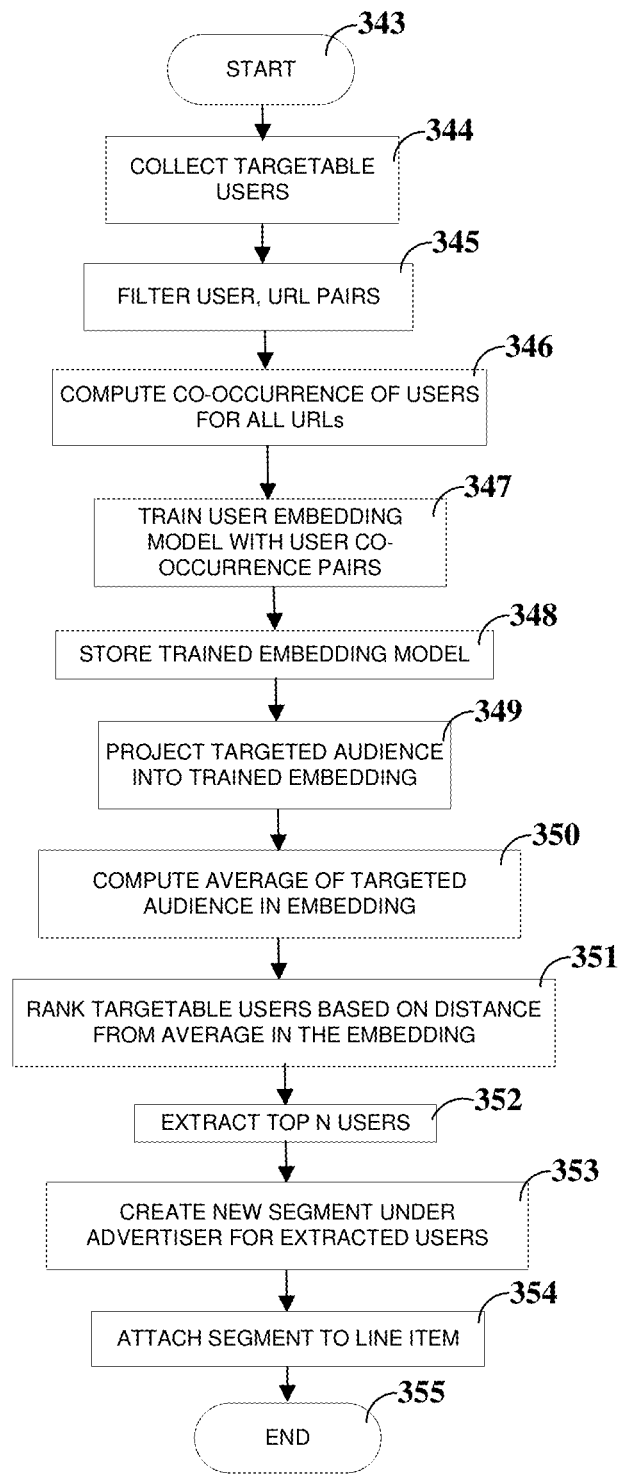
FIG. 3B is a flow diagram illustrating an exemplary, non-limiting embodiment of operation of the system for line item-based audience extension of FIG. 3A in accordance with various aspects described herein.

Referring now to FIG. 3B, FIG. 3B is a flow diagram illustrating an exemplary, non-limiting embodiment of operation of a model training algorithm in accordance with various aspects described herein. In particular, FIG. 3B illustrates a method 342 for training a model in the system 300 for automatically extending an audience for a line item 304 of an advertiser of FIG. 3A. The method begins at step 343.

At step 344, a system such as the system 300 of FIG. 3A collects targetable users for the line item in question. For example, the data collection process 312 of FIG. 3A collects user browsing history. At step 345, the targetable users are filtered for the targetable audience's browsing history. For example, the targetable user filter 316 of FIG. 3A monitors browsing history of all users and stores information about the browsing history in the targetable user data store 320.

At step 346, a co-occurrence matrix is computed for all URLs in the browsing histories. For example, in FIG. 3A, the targetable user list 336 contained in the targetable user data store 320 may be produced and stored in step 344. At step 345, the matrix computing process 324 computes co-occurrence matrix 338. The co-occurrence matrix 338 stores users as user pairs according to user identifier, where users of a user pair have a URL in common based on browsing history.

At step 347, a user embedding model is trained using the user-user co-occurrence pairs of the co-occurrence matrix. In the embodiment of FIG. 3A, the offline training process 326 trains a user embedding model and stores the user embedding model in model storage 328. A user embedding model gives a relative location or a relative distance value for two or more users. In some embodiments, the model is a deep learning model that encodes users' browsing history in a low-dimensional embedding space where similarly behaving users cluster together.

An embedding is a mapping of a discrete variable to a vector of continuous numbers. Embeddings may be low-dimensional, learned continuous vector representations of discrete variables. Embedding spaces may be useful to reduce the dimensionality of categorical variables and to meaningfully represent categories in the transformed space. An embedding has a useful purpose to finding nearest neighbors in the embedding space. These can be used, for example, to make recommendations based on user interests or cluster categories. An embedding can also be used as an input to a machine learning model for a supervised task.

At step 348, the trained model is stored and at step 349, the targeted audience is projected onto the trained embedding. At step 350, an average of the targeted audience in the embedding is computed and at step 351. The average of the embedding is comparable to a center of gravity or a centroid. The average of the embedding may be used to determine which targetable users are closest to the campaign, or which users have the most in common with already targeted users of the campaign or line item 304. At step 351, using the average of the embedding, the targetable users may be ranked based on a respective distance in the embedding from a respective user to the average of the embedding.

In FIG. 3A, a user recommendation process 330 generates a list of recommended user identifiers. The recommended user identifiers may be based, for example, on the ranking produced at step 351 of FIG. 3B. For example, the highest N ranked targetable users, extracted at step 352 of FIG. 3B, and identified by user identifier, may be added to a list 340 of recommended users. In one example, the number N of ranked targetable users may be a predetermined number such as 1000, 10,000 or 100,000 recommended users. Segment creation process 332 may combine the list 340 of recommended user into a new segment, corresponding to step 353 of FIG. 3B. At step 354, the new segment is attached to the line item 304.

In FIG. 3A, new segment 310 is designated segment_k+1. Prior to operation of the system 300, or the method 342, line item 304 included as a constraint 1 segments designated segment_1, . . . segment_k. Following operation of the system 300, or the method 342, the line item 304 includes as a constraint 1 segments designated segment_1, . . . segment_k+1. Thus, the audience for the line item 304, as defined by the segments to which the line item is exposed, has been automatically expanded by locating targetable users which are most like the originally targeted users. A group of the located targetable users which most closely match the originally targeted users has been defined as the new segment 310, given a new segment identifier and attached to the line item 304.

In FIG. 2B, the new segment 310 may be returned to an impression buyer member 228, 230, 232, 234, 236 and stored in the server-side user data store 242. Advising the impression buyer members alerts them to a potentially interesting new segment 310 they may be interested in. Information connecting user identification information for a user or the user's browser 224 will be maintained in the server-side user data store 242. When future impressions are received by the advertising platform 214, the platform will determine if the user or impression consumer web browser 224 is part of the new segment 310. If so, one of the impression buyer members 228, 230, 232, 234, 236 may elect to bid on the impression.

Figure 3C:
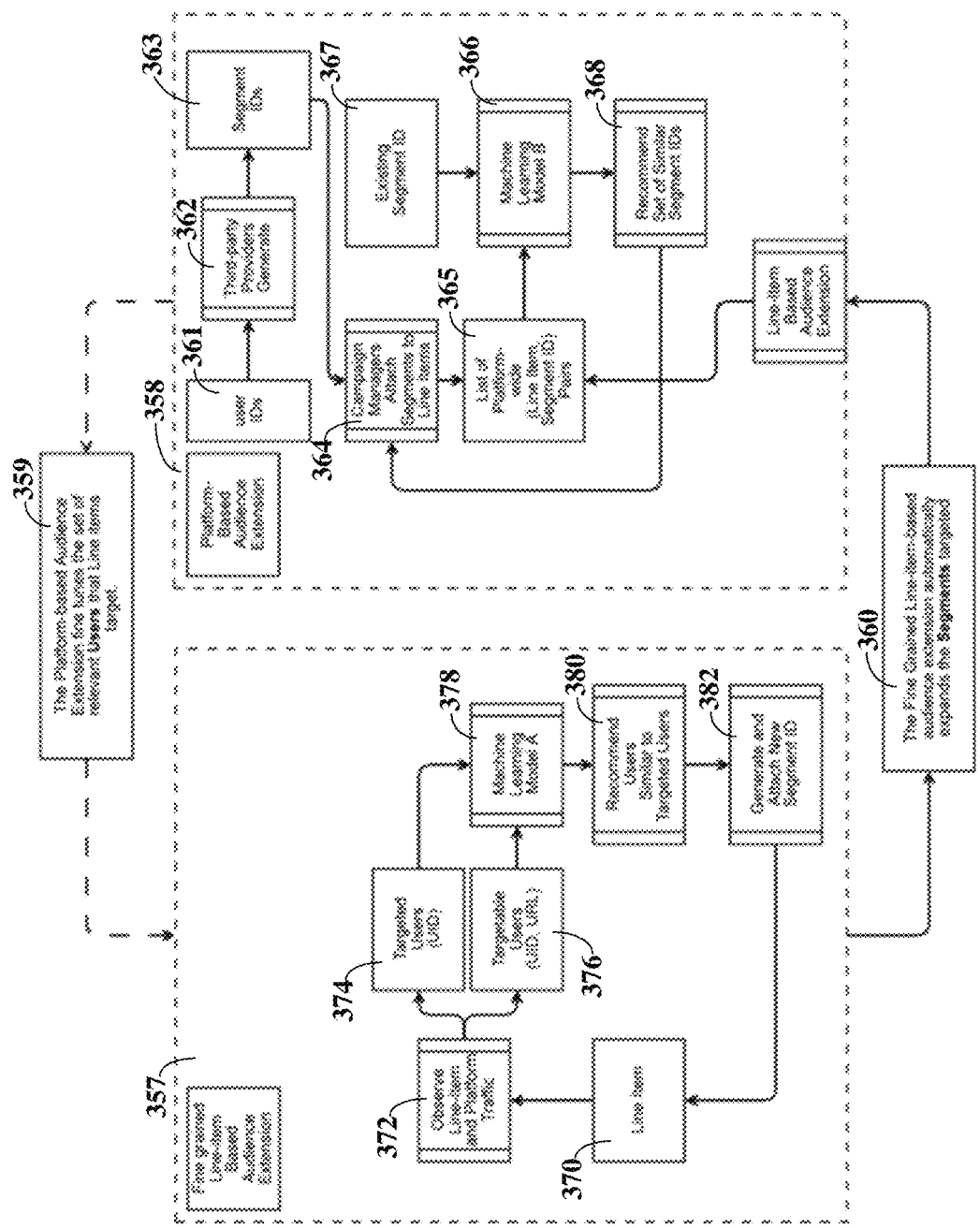
FIG. 3C is a data flow system diagram of an exemplary, non-limiting embodiment of a system for audience extension for an online advertising system in accordance with various aspects described herein.

FIG. 3C illustrates a data flow system diagram of an embodiment of a system 356 for audience extension in an online advertising system such as the advertising system implement by the advertising platform 214. The system 356 includes a fine grained line-item based audience extension process 357 and a platform-based audience extension process 358.

In the embodiment of FIG. 3C, the fine grained line-item based audience extension process 357 and the platform-based audience extension process 358 cooperate in a cycle to improve the audience for the advertisements being shown on a platform such as advertising platform 214. That is, the platform-based audience extension process 358 enables recommendation to a campaign manager or campaign manager device segments similar to those selected or targeted by the campaign manager. If recommended segments are added by the campaign manager, the campaign or line item will see more traffic and because of the similarity of the recommended segments to the originally targeted segments, the added traffic will be high quality traffic. That is, the additional users who will see the advertisement associated with the line item will be more likely to interact with the advertisement and the advertisement will be more successful. This is represented in FIG. 3C by block 359, which represents at least an implicit feedback operation. Similarly, the fine grained line-item based audience extension process 357 operates to generate new segments. The new segments include users who are similar to users whom the campaign manager targeted. Thus, the new segments include users who are more likely to interact with the advertisement associated with the line item and the advertisement will, again, be more successful Thus, the fine grained line-item based audience extension process 357 and the platform-based audience extension process 358 may cooperate together to adjust and improve users and audience segments to which advertisements may be displayed. As indicated at block 359, the platform-based audience extension process 358 fine tunes the set of relevant users that line items of an advertiser target. And as indicated at block 360, the fine grained line-item based audience extension process 357 automatically expands the segments targeted by the ad campaign. This allows advertisers to expand their audience in an informed way.

The platform-based audience extension process 358 includes a set of user identifiers 361, an information generation process 362 by third party providers to produce a set of segment identifiers 363. The platform-based audience extension process 358 further includes a campaign manager process 364, information defining line items and associated segment identifiers including a list 365 of line item and segment identifier pairs, a machine learning model 366, an existing segment identifier 367, a segment identifier recommendation process 368.

Third party providers have access to the set of user identifiers 361. The user identifiers 361 in general are a set of data that uniquely identify a user who may be available to receive an impression of an advertisement. The users may register with the advertising platform 214 (FIG. 2B), provide identifying information at some point in time, or in some other way provide information which allows them to be uniquely identified. This information may be included with an impression when an impression is received by the advertising platform 214. One or more third party providers generate information in the process 362 based on the user identifiers 361 including a set of segment identifiers 363. The segment identifiers 363 groups of user identifiers that are considered to be related to each other by the one or more third party providers. Examples of segment definitions include "male," "female," and "automobile owners." Typically, each third party provider will have its own taxonomy of segments among users. In some embodiments, there may be tens of thousands of segments and associated segment identifiers.

An advertising campaign is initiated by and managed by a campaign manager. The campaign manager may be an individual employed by an advertiser, an advertising agency or an advertising network. In some embodiments, the campaign manager may be in part an automated process controlled by and reporting to a human individual. The campaign manager process 364 may be an automated process operating on a campaign manager device, such as a computer or other data processing system. Data regarding one or more line items or a campaign may be exchanged between the campaign manager device and other components of the system. The campaign manager process 364 includes a decision to spend money and other resources advertising a product or service. Each advertising campaign may be referred to as a line item. The line item defines features of the campaign, such as a budget, campaign start date and campaign end date, and other features. In the campaign manager process 364, the campaign manager attaches one or more segments to a line item. This will have the effect of making a campaign be more prone to a specific group of the population, where the group is defined by the one or more segments.

Further, the campaign manager process 364 generates the list 365 of line item and segment identifier pairs. In particular, the campaign manager process 364 generates a list of platform-wide (line item, Segment ID) pairs. The list 365 includes data pairs that link campaign line items to segments. The list 365 and other information may be accessed and used across the advertising platform 214, FIG. 2B.

The list 365 of (line item, Segment ID) pairs is provided to the machine learning model 366. The list 365 of (line item, Segment ID) pairs is used to train the machine learning model 366. The campaign manager or other source specifies the existing segment identifier 367 and the machine learning model 366 uses the list 365 of (line item, (Segment ID) pairs.

In some embodiments, the machine learning model 366 may be a recommender system for providing the recommended set of similar segment identifiers in the process 368. A recommender system makes a prediction based on users' historical behaviors. In one embodiment, the machine learning model is built using a collaborative filtering process. The collaborative filtering makes use of the mapping between line items and segment identifiers in the list 365. Other embodiments may user alternative types of machine learning. The machine learning model 366 generates a set of similar segment identifiers in the process 368. The list of similar segment identifiers is made available to the campaign manager process 364. The campaign manager, or the campaign manager process 364, can elect to attach one or more recommended segment identifiers of the list of segment identifiers in the process 368 to the line item. This has the effect of expanding the audience for the line item by adding additional related segments, as recommended by the machine learning model 366. The attached recommended segment identifiers are added to the list 365 of platform-wide (line item, Segment ID) pairs.

The fine grained line-item based audience extension process 357 includes a line item 370, a process 372 to observe line item and platform traffic, a set of targeted users 374 and a set of targetable users 376, a machine learning model 378, a user recommendation process 380 and a new segment generation process 382.

In the fine grained line-item based audience extension process 357, the line item 370 is designated by the campaign manager for audience extension. The line item 370 may be one of many campaigns managed by the campaign manager or other individual. The fine grained line-item based audience extension process 357 thereupon operates to automatically recommend segments to extend the list of segments that the line item should be targeting.

The process 372 to observe line item and platform traffic operates to monitor received impressions and delivered advertisement on the platform, such as advertising platform 214 in FIG. 2B. The users associated with the impressions are designated as targeted users 374. These may be termed seed users or targeted users or users whom the campaign manager consciously wants to target. The process 372 to observe line item and platform traffic also has access to all users accessing the platform, identified by user identifier (UID) and uniform resource locator (URL). These users are designated as targetable users 376. The set of targetable users 376 may include the set of targeted users 374 as a subset.

The machine learning model 378 receives the list of targeted users 374 and the list of targetable users 376. The machine learning model 378 operates to determine user identifiers that correspond to users who are related to each other, or similar to each other, to justify expanding the audience for the line item 370 to include the related users. In some embodiments, the machine learning model 378 may be implemented using a collaborative filtering approach. Further in some embodiments, the machine learning model 378 may be implemented using an embedding space. The collaborative filter or embedding space makes use of a mapping between user identifier UID and universal resource locator (URL). Other implementations and embodiments may be substituted. The machine learning model 378 generates a list of the targetable users 376 that are similar to the targeted users 376 and provides the list to the user recommendation process 380.

The user recommendation process 380 generates a list of recommended users to attach to the line item 370. The list may include, for example, a list of user identifiers for each recommended user. The list of recommended users is provided to the new segment generation process 382 which generates a new segment including the list of recommended users. The new segment is attached to the line item 370.

The fine grained line-item based audience extension process 357 and the platform-based audience extension process 358 supplement each other to improve audience targeting for an advertiser. As indicated at block 360, the fine grained line-item based audience extension process 357 automatically expands the segments targeted by the ad campaign. As the loop including line item 370 through new segment generation process 382 of the fine grained line-item based audience extension process 357 proceeds, it increases the list of segments attached to a line item. The new segments include users who are identified as similar to the targeted users 374 and are thus relatively high quality. The new segments are highly related segments to the segment associated with the existing segment identifier 367 initially selected by the campaign manager process 364. Moreover, the new segments are highly related to the segments initially attached to the line item for targeting by the campaign manager in the campaign manager process 364.

Each new segment generated by the new segment generation process 382 is added to the list 365 of platform-wide (line item, Segment ID) pairs of the platform-based audience extension process 358. This list 365 of platform-wide (line item, Segment ID) pairs is then used to train the machine learning model 366. Each new segment added by the new segment generation process 382 is a segment that is or may be closely related to the set of targeted users 374, based on operation of the process 372 to observe line item and platform traffic. As the list 365 of platform-wide (line item, Segment ID) pairs is improved by adding new, related segments generated by the new segment generation process 382, the quality of the training of the machine learning model 366 is improved as well. As a result of improved training, the quality of the output of the machine learning model 366 is improved. Improvement of the output of the machine learning model 366 means that the recommended set of similar segment identifiers generated in the process 368 is improved, providing the campaign managers with improved recommendations of segments and segment identifiers to attach to the list 365 of platform-wide (line item, Segment ID) pairs. This process of improved recommendations operates to improve the list 365 of platform-wide (line item, Segment ID) pairs as well. When that list is improved, the line item will see increased traffic on the platform. As indicated at block 359, the platform-based audience extension process 358 fine tunes the set of relevant users that line items of an advertiser target. That is, with more traffic, the list of targetable users 376 accessing the platform increases with increasing traffic. The machine learning model 378 therefore has more targetable users 376 to identify as users similar to the targeted users 374. The two processes 357, 358 therefore reinforce and supplement each other. This allows advertisers to expand their audience in an informed way.

Figure 3D:
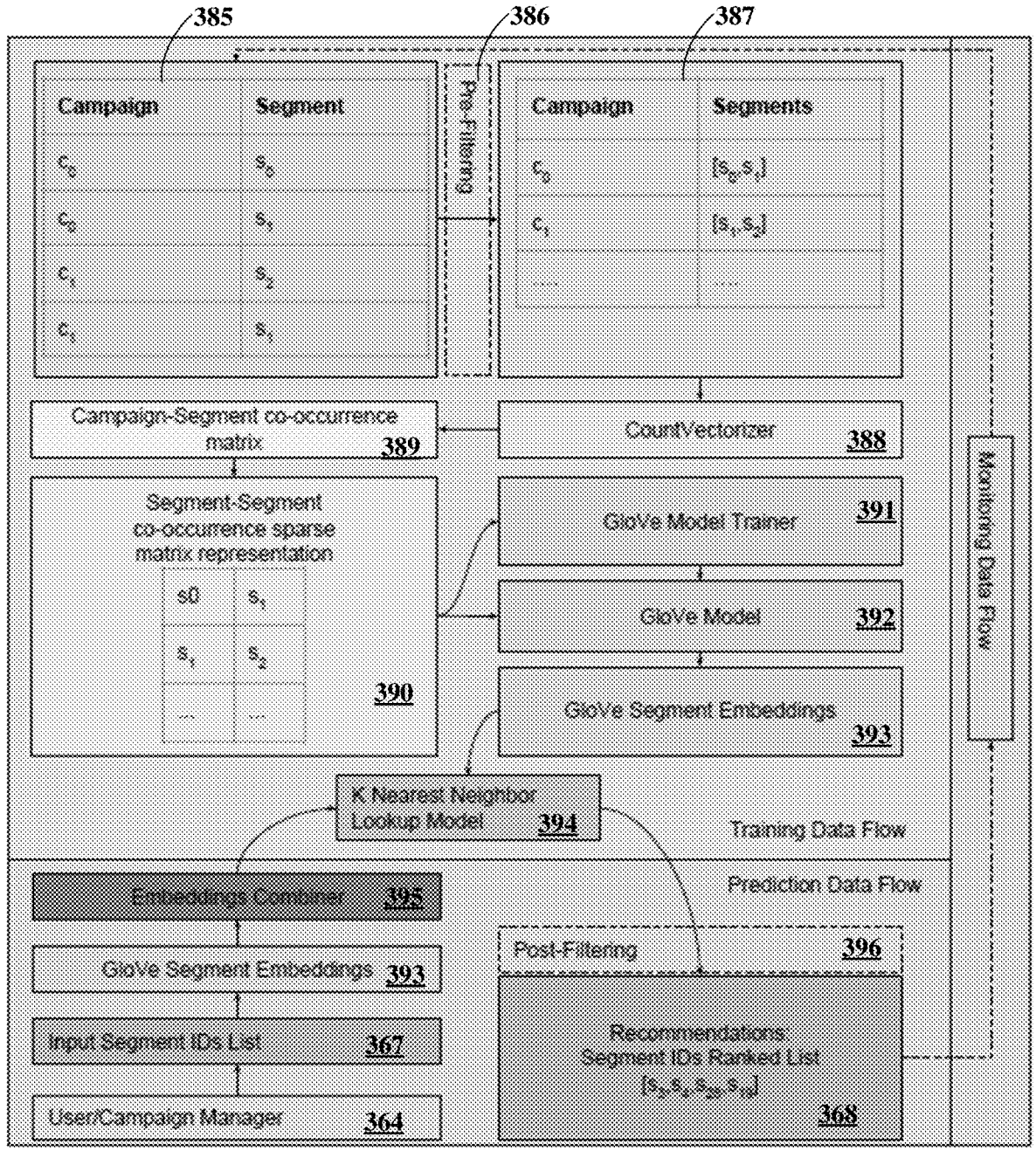
FIG. 3D is a data flow system diagram illustrating an exemplary, non-limiting embodiment of an audience recommendation system in accordance with various aspects described herein.

FIG. 3D an exemplary system diagram of an audience recommendation system. In an exemplary embodiment, the system and method convert the campaign-segment interactions to a segment-segment co-occurrence sparse matrix. The system and method then train a machine learning model and extract embeddings for all the known segments which are used to train the K-NN model. In the example, the system uses the GloVe embedding model. At prediction time the system and method parse the user input list of segments and convert them to their embedding representations. If more than one segment is provided, the system and method combine the embeddings by averaging those segments in the embedding space. Other embedding combiners may be alternatively used. The system and method use the K-NN model to get the top-k segments that lie closest to the input segments in the embedding space and present them to the user. During the monitoring and re-training phase the system and method collect the latest segments that were associated with live campaigns and feed these associations back to model training.

Note that the exemplary system and method employ a set of pre-filtering and post-filtering rules to assure that the training data and the generated predictions fully comply with a set of contractual obligations related to segment visibility rules. Due to the ephemeral nature of the segments lifecycle, the system and method do not use the previous embeddings and re-calculate all the embeddings from scratch on every model update. It is important to understand changes in segments' meaning across time.

FIG. 3D is a data flow system diagram illustrating an exemplary, non-limiting embodiment of an audience recommendation system 384 in accordance with various aspects described herein. The terms campaign and line item may be used interchangeably. The audience recommendation system 384 includes a line item to segment mapping 385, a pre-filtering operation 386, a filtered line item to segment mapping 387, a count vectorizer 388, a campaign-segment co-occurrence sparse matrix 389, a segment-segment co-occurrence sparse matrix representation 390, a machine learning model trainer 391, a machine learning model 392, segment embeddings 393, a nearest neighbor lookup model 394, an embeddings combiner and a post filtering operation 396. Other embodiments may include additional, fewer or alternative elements.

The line item to segment mapping 385 may be prepared from the list 365 of platform-wide (line item, Segment ID) pairs produced by the campaign manager process 364 (FIG. 3C). In the line item to segment mapping 385, each line item or campaign $C_n$ is mapped to a segment identifier $S_n$. The pre-filtering operation 386 operates to remove any campaign identifiers or segment identifiers that should be excluded.

The filtered line item to segment mapping 387 includes platform-wide information about all campaign identifiers C. and all segment identifiers $[S_x, S_y]$ to which the campaign identifiers $C_n$ are related. The count vectorizer 388 operates to generate the co-occurrence matrix 389. The co-occurrence matrix 389 is represented by the segment-segment co-occurrence sparse matrix representation 390 which groups segments S0, S1, . . . Sn that occur on the same campaign $C_n$. The co-occurring segment identifiers are added as a row of the segment-segment co-occurrence sparse matrix representation 390. In the illustrated example, filtered line item to segment mapping 387 shows campaign $C_0$ includes segments $[S_0, S_1]$ and campaign $C_1$ includes segments $[S_1, S_2]$. Accordingly, in the segment-segment co-occurrence sparse matrix representation 390, the first row includes segments $S_0, S_1$ and the second row includes segments $S_1, S_2$. For example, segment $S_0$ might correspond to males interested in buying new cars and segment $S_1$ might correspond to new fathers. In the example, they have both been targeted in $C_0$. The segment-segment co-occurrence sparse matrix representation 390 defines a soft linkage between the segments, which co-occurred in the same campaign.

Information from the segment-segment co-occurrence sparse matrix representation 390 is provided to the machine learning model trainer 391 and the machine learning model 392. The machine learning model trainer 391 operates to train the machine learning model 392 using the co-occurrence matrix representation as training data. The machine learning model produces segment embeddings 393.

As explained herein, embeddings such as segment embeddings 393 may be a low-dimensional, learned continuous vector representations of discrete variables such as the segment-segment co-occurrence matrix representation 390. Embedding spaces may be useful to reduce the dimensionality of categorical variables and to meaningfully represent categories in the transformed space. An embedding has a useful purpose to finding nearest neighbors in the embedding space. The embeddings maintain geometrical relationships so that relative distances between embeddings elements are available to describe the relationships between the elements in a nearest-neighbor fashion. These can be used, for example, to make recommendations based on user interests or cluster categories. The segment embeddings 393 receives as an input a segment identifier. The segment embeddings 393 produces as an output information corresponding to a location for the input segment identifier.

The nearest-neighbor lookup model 394 operates to determine locations in the segment embeddings closest to an input location. For example, the nearest-neighbor lookup model may operate to sort elements of the embeddings 393 according to distances. In an operational example, a user such as the campaign manager or the campaign manager process 364 has a list 365 of one or more segment identifiers such as segment identifier 367 (FIG. 3C). The one or more segment identifiers on the list of segment identifiers 367 are provided to the segment embeddings 393 (represented in both the training data flow and the prediction data flow of FIG. 3D). The segment embeddings 393 provides a location for a single segment identifier on the list of segment identifiers 367. If there are multiple segment identifiers on the list of segment identifiers 367, the segment embeddings 393 produces multiple locations for the multiple segment identifiers and the embeddings combiner 395 receives the multiple locations and combines them.

The location information from the embeddings combiner 395 is provided to the lookup model 394. The nearest-neighbor lookup model 394 produces locations of segments that are closest in location in the embeddings to the location of the input segment or multiple input segments. Post-filtering may be applied in the post filtering process 396 and the results are provided to the segment identifier recommendation process 368. The segment identifier recommendation process 368 returns a set of similar segments. The set of similar segments are those which are considered closest in location in the segment embeddings 393 to the one or multiple input segments 367 received from the campaign manager process 364.

The training data flow components of the audience recommendation system 384 include the line item to segment mapping 385, the pre-filtering operation 386, the filtered line item to segment mapping 387, the count vectorizer 388, the campaign-segment co-occurrence matrix 389, the segment-segment co-occurrence sparse matrix representation 390, the machine learning model trainer 391, the machine learning model 392 and generation of the segment embeddings 393. This portion of the audience recommendation system 384 can operate or be run offline, for example, nightly. The process would include generating the segment embeddings 393 and refreshing them. The prediction data flow components of the audience recommendation system 384 include the campaign manager process 364, the embeddings combiner, post filtering and the segment identifier recommendation process 368 operate essentially in real time to provide recommended segments to the user or campaign manager.

In some embodiments, the system and method sub-sampled a random list of (campaign ID, segment ID) pairs from a proprietary system. The dataset was fully anonymized to remove any member level data. Then the (campaign ID, segment ID) pairs were transformed to (segment ID, segment ID) pairs using a count vectorizer to produce the segment co-occurrence matrix.

During the construction of the co-occurrence matrix only the set-membership between segments was used. The cells of the co-occurrence matrix were filled with a binary marker anytime a segment pair ($S_i$, $S_j$) co-appeared on a campaign ($C_k$). Note that this experiment did not use the count of the number of time a ($s_i$, $s_j$) pair co-occurred, and the 0/1 marker was retained only for the co-occurrence matrix and was used as implicit feedback signals.

This embedding matrix in the exemplary embodiment was used to build a K-NN model to speed up the lookup of the K nearest neighbors. Using this model, for each test row, a list of k∈{5, 10, 20} recommended segments was extracted that lie closest to the input segment in the embedding space.

An additional challenge faced by some exemplary embodiments is to provide recommendations for groups of segments. For this requirement, users need to be able to submit a list of segment identifiers and the system and method should be able to return a list of segments that represents some sort of combination of all the segment identifiers that were provided by the users. One embodiment takes direct advantage of the nature of the embedding matrix.

In one embodiment, the method first obtains the embeddings vectors of all the input segments. The system and method in this exemplary embodiment calculate the average of the embeddings vectors (i.e. performing Segment Algebra) which is somewhat equivalent to averaging the conceptual content of the segments provided. Next, this average vector is used to look up the nearest neighbors to this mean segment using the K-NN model.

An apparatus, system or method in accordance with the present embodiments enables the generation of new segments for a line item or campaign using machine learning. Further, the apparatus, system or method enable use of platform-wide information to help optimize individual campaigns. Conventionally, adding audience segments is a manual process, often marked by trial and error to find an optimized set of segments for a campaign. The apparatus, system or method in accordance with the embodiments described herein permit use of platform-wide information about audience members to automatically identify new segments and recommend those to campaign managers to select and add to a campaign. Many other advantages and benefits are provided by the disclosed features and embodiments as well.

Referring now to FIG. 4, a block diagram of a communication network 400 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems, and methods presented in FIGS. 1, 2A, 2B, 2C, 2D, 2E, 2F and 3A, 3B, 3C, 3D and 3E. For example, virtualized communication network 400 can facilitate in whole or in part an online content delivery system which conducts an auction among bids to server an advertisement to a web page to fill an impression. The virtualized communication network 400 can implement a ratio pacing system to detect and compensate for unintentional bias or skew introduced in serving of content items.

In particular, a cloud networking architecture is shown that leverages cloud technologies and supports rapid innovation and scalability via a transport layer 450, a virtualized network function cloud 425 and/or one or more cloud computing environments 475. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 430, 432, 434, etc. that perform some or all of the functions of network elements. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 430 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 450 includes fiber, cable, wired and/or wireless transport elements, network elements and interfaces to provide broadband access 410, wireless access 420, voice access 415, media access 440 and/or access to content sources for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 430, 432 or 434. These network elements can be included in transport layer 450.

The virtualized network function cloud 425 interfaces with the transport layer 450 to provide the VNEs 430, 432, 434, etc. to provide specific NFVs. In particular, the virtualized network function cloud 425 leverages cloud operations, applications, and architectures to support networking workloads. The virtualized network elements 430, 432 and 434 can employ network function software that provides either a one-for-one mapping of traditional network element function or alternately some combination of network functions designed for cloud computing. For example, VNEs 430, 432 and 434 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and overall which creates an elastic function with higher availability than its former monolithic version. These virtual network elements 430, 432, 434, etc. can be instantiated and managed using an orchestration approach similar to those used in cloud compute services.

The cloud computing environments 475 can interface with the virtualized network function cloud 425 via APIs that expose functional capabilities of the VNEs 430, 432, 434, etc. to provide the flexible and expanded capabilities to the virtualized network function cloud 425. In particular, network workloads may have applications distributed across the virtualized network function cloud 425 and cloud computing environment 475 and in the commercial cloud or might simply orchestrate workloads supported entirely in NFV infrastructure from these third party locations.

Figure 5:
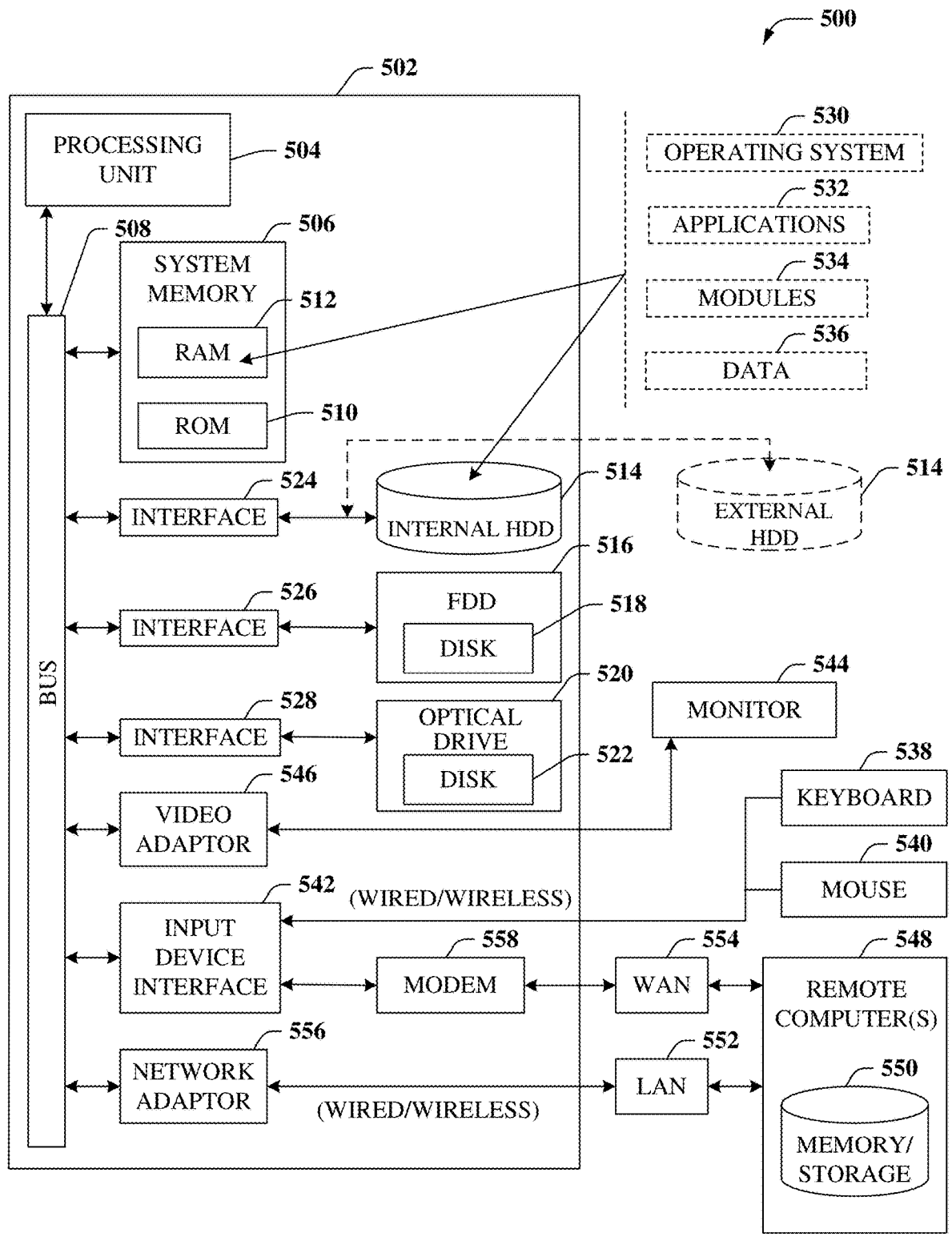
FIG. 5 is a block diagram of an example, non-limiting embodiment of a computing environment in accordance with various aspects described herein.

Turning now to FIG. 5 there is illustrated a block diagram of a computing environment in accordance with various aspects described herein. In order to provide additional context for various embodiments of the embodiments described herein, FIG. 5 and the following discussion are intended to provide a brief, general description of a suitable computing environment 500 in which the various embodiments of the subject disclosure can be implemented. In particular, computing environment 500 can be used in the implementation of network elements 150, 152, 154, 156, access terminal 112, base station or access point 122, switching device 132, media terminal 142, and/or VNEs 430, 432, 434, etc. Each of these devices can be implemented via computer-executable instructions that can run on one or more computers, and/or in combination with other program modules and/or as a combination of hardware and software. For example, computing environment 500 can facilitate in whole or in part an online content delivery system which conducts an auction among bids to server an advertisement to a web page to fill an impression. The communication network 100 can implement a ratio pacing system to detect and compensate for unintentional bias or skew introduced in serving of content items.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 5, the example environment can comprise a computer 502, the computer 502 comprising a processing unit 504, a system memory 506 and a system bus 508. The system bus 508 couple's system components including, but not limited to, the system memory 506 to the processing unit 504. The processing unit 504 can be any of various commercially available processors. Dual microprocessors and other multiprocessor architectures can also be employed as the processing unit 504.

The system bus 508 can be any of several types of bus structure that can further interconnect to a memory bus (with or without a memory controller), a peripheral bus, and a local bus using any of a variety of commercially available bus architectures. The system memory 506 comprises ROM 510 and RAM 512. A basic input/output system (BIOS) can be stored in a non-volatile memory such as ROM, erasable programmable read only memory (EPROM), EEPROM, which BIOS contains the basic routines that help to transfer information between elements within the computer 502, such as during startup. The RAM 512 can also comprise a high-speed RAM such as static RAM for caching data.

The computer 502 further comprises an internal hard disk drive (HDD) 514 (e.g., EIDE, SATA), which internal HDD 514 can also be configured for external use in a suitable chassis (not shown), a magnetic floppy disk drive (FDD) 516, (e.g., to read from or write to a removable diskette 518) and an optical disk drive 520, (e.g., reading a CD-ROM disk 522 or, to read from or write to other high capacity optical media such as the DVD). The HDD 514, magnetic FDD 516 and optical disk drive 520 can be connected to the system bus 508 by a hard disk drive interface 524, a magnetic disk drive interface 526 and an optical drive interface 528, respectively. The hard disk drive interface 524 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 512, comprising an operating system 530, one or more application programs 532, other program modules 534 and program data 536. All or portions of the operating system, applications, modules, and/or data can also be cached in the RAM 512. The systems and methods described herein can be implemented utilizing various commercially available operating systems or combinations of operating systems.

A user can enter commands and information into the computer 502 through one or more wired/wireless input devices, e.g., a keyboard 538 and a pointing device, such as a mouse 540. Other input devices (not shown) can comprise a microphone, an infrared (IR) remote control, a joystick, a game pad, a stylus pen, touch screen or the like. These and other input devices are often connected to the processing unit 504 through an input device interface 542 that can be coupled to the system bus 508, but can be connected by other interfaces, such as a parallel port, an IEEE 1394 serial port, a game port, a universal serial bus (USB) port, an IR interface, etc.

A monitor 544 or other type of display device can be also connected to the system bus 508 via an interface, such as a video adapter 546. It will also be appreciated that in alternative embodiments, a monitor 544 can also be any display device (e.g., another computer having a display, a smart phone, a tablet computer, etc.) for receiving display information associated with computer 502 via any communication means, including via the Internet and cloud-based networks. In addition to the monitor 544, a computer typically comprises other peripheral output devices (not shown), such as speakers, printers, etc.

The computer 502 can operate in a networked environment using logical connections via wired and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically comprises many or all of the elements described relative to the computer 502, although, for purposes of brevity, only a remote memory/storage device 550 is illustrated. The logical connections depicted comprise wired/wireless connectivity to a local area network (LAN) 552 and/or larger networks, e.g., a wide area network (WAN) 554. Such LAN and WAN networking environments are commonplace in offices and companies, and facilitate enterprise-wide computer networks, such as intranets, all of which can connect to a global communications network, e.g., the Internet.

When used in a LAN networking environment, the computer 502 can be connected to the LAN 552 through a wired and/or wireless communication network interface or adapter 556. The adapter 556 can facilitate wired or wireless communication to the LAN 552, which can also comprise a wireless AP disposed thereon for communicating with the adapter 556.

When used in a WAN networking environment, the computer 502 can comprise a modem 558 or can be connected to a communications server on the WAN 554 or has other means for establishing communications over the WAN 554, such as by way of the Internet. The modem 558, which can be internal or external and a wired or wireless device, can be connected to the system bus 508 via the input device interface 542. In a networked environment, program modules depicted relative to the computer 502 or portions thereof, can be stored in the remote memory/storage device 550. It will be appreciated that the network connections shown are example and other means of establishing a communications link between the computers can be used.

The computer 502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 6:
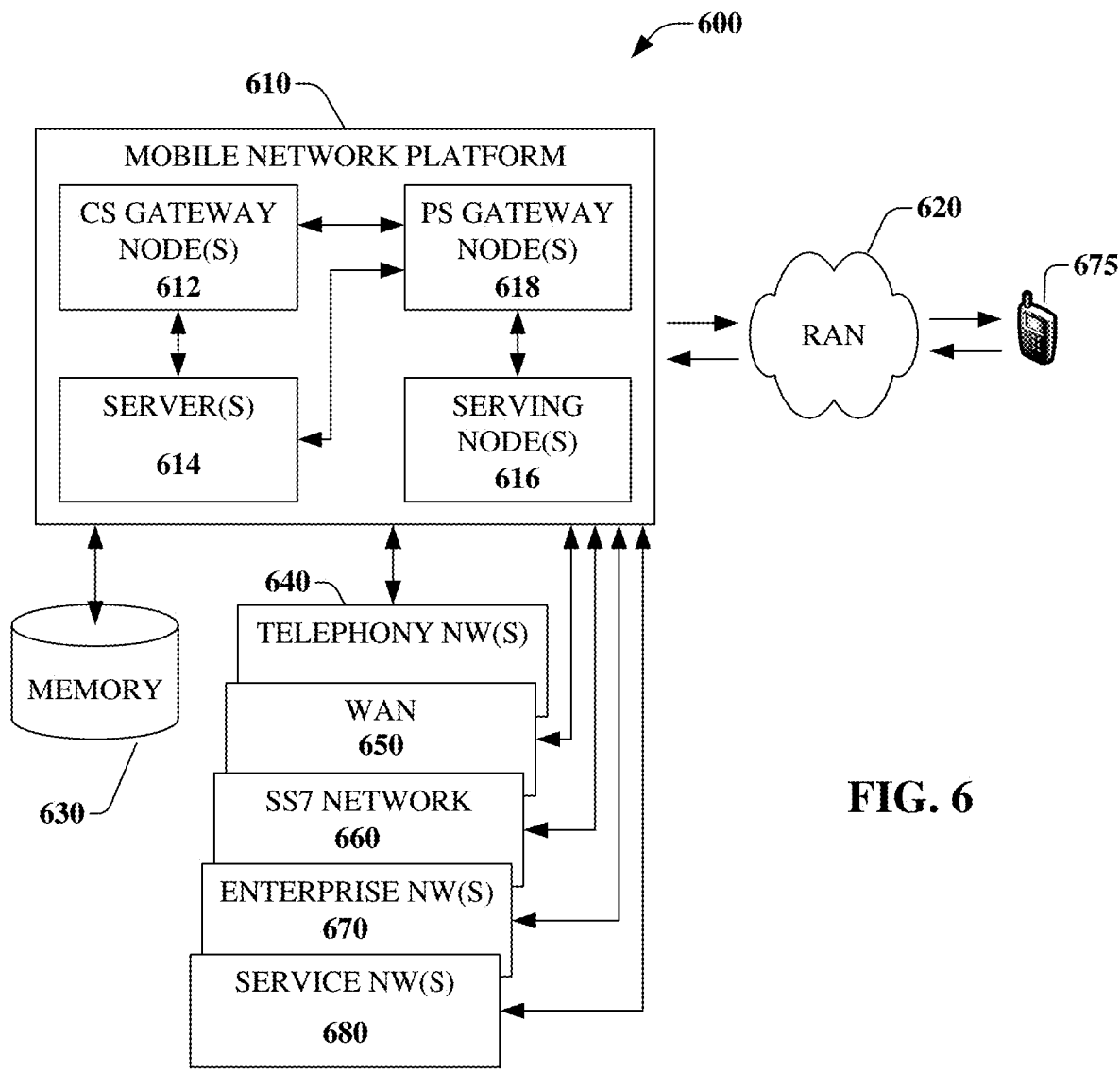
FIG. 6 is a block diagram of an example, non-limiting embodiment of a mobile network platform in accordance with various aspects described herein.

Turning now to FIG. 6, an embodiment 600 of a mobile network platform 610 is shown that is an example of network elements 150, 152, 154, 156, and/or VNEs 430, 432, 434, etc. For example, platform 610 can facilitate in whole or in part an online content delivery system which conducts an auction among bids to server an advertisement to a web page to fill an impression. The communication network 100 can implement a ratio pacing system to detect and compensate for unintentional bias or skew introduced in serving of content items. In one or more embodiments, the mobile network platform 610 can generate and receive signals transmitted and received by base stations or access points such as base station or access point 122. Generally, mobile network platform 610 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 610 can be included in telecommunications carrier networks and can be considered carrier-side components as discussed elsewhere herein. Mobile network platform 610 comprises CS gateway node(s) 612 which can interface CS traffic received from legacy networks like telephony network(s) 640 (e.g., public switched telephone network (PSTN), or public land mobile network (PLMN)) or a signaling system #7 (SS7) network 660. CS gateway node(s) 612 can authorize and authenticate traffic (e.g., voice) arising from such networks. Additionally, CS gateway node(s) 612 can access mobility, or roaming, data generated through SS7 network 660; for instance, mobility data stored in a visited location register (VLR), which can reside in memory 630. Moreover, CS gateway node(s) 612 interfaces CS-based traffic and signaling and PS gateway node(s) 618. As an example, in a 3GPP UMTS network, CS gateway node(s) 612 can be realized at least in part in gateway GPRS support node(s) (GGSN). It should be appreciated that functionality and specific operation of CS gateway node(s) 612, PS gateway node(s) 618, and serving node(s) 616, is provided and dictated by radio technology or technologies utilized by mobile network platform 610 for telecommunication over a radio access network 620 with other devices, such as a radiotelephone 675.

In addition to receiving and processing CS-switched traffic and signaling, PS gateway node(s) 618 can authorize and authenticate PS-based data sessions with served mobile devices. Data sessions can comprise traffic, or content(s), exchanged with networks external to the mobile network platform 610, like wide area network(s) (WANs) 650, enterprise network(s) 670, and service network(s) 680, which can be embodied in local area network(s) (LANs), can also be interfaced with mobile network platform 610 through PS gateway node(s) 618. It is to be noted that WANs 650 and enterprise network(s) 670 can embody, at least in part, a service network(s) like IP multimedia subsystem (IMS). Based on radio technology layer(s) available in technology resource(s) or radio access network 620, PS gateway node(s) 618 can generate packet data protocol contexts when a data session is established; other data structures that facilitate routing of packetized data also can be generated. To that end, in an aspect, PS gateway node(s) 618 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 600, mobile network platform 610 also comprises serving node(s) 616 that, based upon available radio technology layer(s) within technology resource(s) in the radio access network 620, convey the various packetized flows of data streams received through PS gateway node(s) 618. It is to be noted that for technology resource(s) that rely primarily on CS communication, server node(s) can deliver traffic without reliance on PS gateway node(s) 618; for example, server node(s) can embody at least in part a mobile switching center. As an example, in a 3GPP UMTS network, serving node(s) 616 can be embodied in serving GPRS support node(s) (SGSN).

For radio technologies that exploit packetized communication, server(s) 614 in mobile network platform 610 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 610. Data streams (e.g., content(s) that are part of a voice call or data session) can be conveyed to PS gateway node(s) 618 for authorization/authentication and initiation of a data session, and to serving node(s) 616 for communication thereafter. In addition to application server, server(s) 614 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 610 to ensure network's operation and data integrity in addition to authorization and authentication procedures that CS gateway node(s) 612 and PS gateway node(s) 618 can enact. Moreover, provisioning server(s) can provision services from external network(s) like networks operated by a disparate service provider; for instance, WAN 650 or Global Positioning System (GPS) network(s) (not shown). Provisioning server(s) can also provision coverage through networks associated to mobile network platform 610 (e.g., deployed and operated by the same service provider), such as the distributed antennas networks shown in FIG. 1 that enhance wireless service coverage by providing more network coverage.

It is to be noted that server(s) 614 can comprise one or more processors configured to confer at least in part the functionality of mobile network platform 610. To that end, the one or more processor can execute code instructions stored in memory 630, for example. It should be appreciated that server(s) 614 can comprise a content manager, which operates in substantially the same manner as described hereinbefore.

In example embodiment 600, memory 630 can store information related to operation of mobile network platform 610. Other operational information can comprise provisioning information of mobile devices served through mobile network platform 610, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 630 can also store information from at least one of telephony network(s) 640, WAN 650, SS7 network 660, or enterprise network(s) 670. In an aspect, memory 630 can be, for example, accessed as part of a data store component or as a remotely connected memory store.

In order to provide a context for the various aspects of the disclosed subject matter, FIG. 6, and the following discussion, are intended to provide a brief, general description of a suitable environment in which the various aspects of the disclosed subject matter can be implemented. While the subject matter has been described above in the general context of computer-executable instructions of a computer program that runs on a computer and/or computer, those skilled in the art will recognize that the disclosed subject matter also can be implemented in combination with other program modules. Generally, program modules comprise routines, programs, components, data structures, etc. that perform particular tasks and/or implement particular abstract data types.

Figure 7:
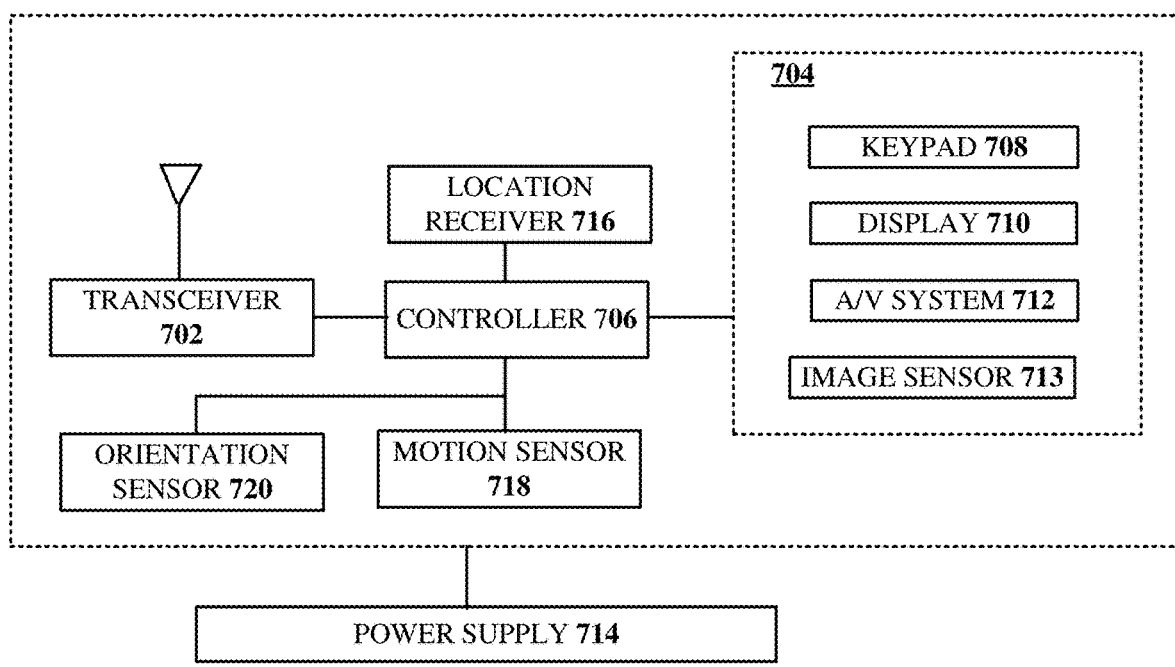
FIG. 7 is a block diagram of an example, non-limiting embodiment of a communication device in accordance with various aspects described herein.

Turning now to FIG. 7, an illustrative embodiment of a communication device 700 is shown. The communication device 700 can serve as an illustrative embodiment of devices such as data terminals 114, mobile devices 124, vehicle 126, display devices 144 or other client devices for communication via either communications network 125. For example, computing device 700 can facilitate in whole or in part an online content delivery system which conducts an auction among bids to server an advertisement to a web page to fill an impression. The communication network 100 can implement a ratio pacing system to detect and compensate for unintentional bias or skew introduced in serving of content items.

The communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface having graphical user interface (GUI) elements that can be selected by a user with a touch of a finger. The display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable communications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to an operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving, from a campaign manager device, information defining a line item in an online advertising system, wherein the receiving comprises receiving information defining constraints for the line item;
collecting browsing history information for targetable users matching the constraints for the line item;
generating a machine learning model to rank the targetable users;
building a new segment based on users ranked by the machine learning model;
combining the new segment with information identifying the line item with information about other line items and segments on a platform of the online advertising system to form a list of platform-wide line item, segment identifier pairs;
generating a second machine learning model, including:
forming a line item to segment mapping;
generating a line item to segment co-occurrence matrix based on the line item to segment mapping;
training the second machine learning model, the training comprising using information from the line item to segment co-occurrence matrix; and
producing a segment embeddings space responsive to the training the second machine learning model;
receiving, from the second machine learning model, a list of recommended segments to add to the line item;
providing, to the campaign manager device, a recommendation to add the new segment to the line item, the recommendation including the list of recommended segments to add to the line item;
receiving from the campaign manager device an indication to attach the new segment to the line item, wherein the receiving comprises receiving an indication of one or more additional segments of the list of recommended segments to add to the line item; and
subsequent to the receiving the indication, providing advertisement content to targeted users according to the line item including the one or more additional segments.

2. The device of claim 1, wherein the generating the machine learning model to rank the targetable users comprises:
filtering the targetable users according to universal resource locator (URL) information in the collected browsing history information;
computing co-occurrence for the targetable users based on the URL information to generate user-user co-occurrence pairs;
training a user embedding model including the segment embeddings space with the user-user co-occurrence pairs; and
storing the trained user embedding model in a memory.

3. The device of claim 2, wherein the training the user embedding model comprises training a machine learning model that encodes user browser histories into the segment embeddings space where similarly behaving users cluster together.

4. The device of claim 3, wherein the training the user embedding model comprises using historical data to train the user embedding model for all targetable users that the line item would target if it did not have the constraints for the line item.

5. The device of claim 2, wherein the operations further comprise:
determining, from the information defining constraints for the line item, a targeted audience for the line item;
projecting the targeted audience into the trained user embedding model;
computing an average of the targeted audience in the trained user embedding model;

ranking two or more targetable users based on distance of each targetable user from the average of the targeted audience in the trained user embedding model;
selecting a predetermined number of ranked targetable users; and
creating the new segment including the selected predetermined number of users.

6. The device of claim 1, wherein the operations further comprise:
receiving, from the campaign manager device, an input list of segment identifiers;
providing the list of segment identifiers to the segment embeddings space;
receiving from the segment embeddings space an output list of segment identifiers having locations in the segment embeddings space closest to segments of the input list of segment identifiers;
ranking the output list of segment identifiers; and
providing a second predetermined number of segment identifiers of the ranked output list of segment identifiers to the campaign manager device as the list of recommended segments to add to the line item.

7. The device of claim 1, further comprising:
receiving, from the campaign manager device, the list of platform-wide line item, segment identifier pairs; and
receiving, from the campaign manager device, an identifier for an existing segment.

8. The device of claim 7, further comprising:
filtering the line item to segment mapping to remove campaign identifiers or segment identifiers from the list of platform-wide line item, segment identifier pairs.

9. The device of claim 7, wherein the generating a line item to segment co-occurrence matrix comprises linking segments which occurred in a common campaign.

10. A method, comprising:
receiving, by a processing system including a processor, identification information defining a line item of an online advertising system and constraint information defining constraints for the line item, wherein the receiving the identification information comprises receiving the identification information from a campaign manager device associated with the line item;
collecting, by the processing system, information about browsing history of targeted users targeted by the line item;
collecting, by the processing system, information about browsing history for targetable users in the online advertising system;
training, by the processing system, a machine learning model, wherein the training comprises using the information about browsing history for targetable users;
providing, by the processing system, the information about browsing history for targeted users as an input to the machine learning model;
receiving, by the processing system, from the machine learning model, information defining recommended user identifiers associated with at least some of the targetable users;
creating, by the processing system, a new segment, wherein the creating the new segment comprises combining the information defining recommended user identifiers to form the new segment
combining, by the processing system, the line item and a segment identifier associated with the new segment with a list of pairs of line items and segment identifiers;
generating a second machine learning model, including forming a line item to segment mapping;
generating a line item to segment co-occurrence matrix based on the line item to segment mapping;
training the second machine learning model using information from the line item to segment co-occurrence matrix; and
producing a segment embeddings space responsive to the training the second machine learning model;
providing, by the processing system, the list of pairs of line items and segment identifiers to the second machine learning model;
receiving, by the processing system, from the second machine learning model, a recommended set of similar segment identifiers; and
attaching, by the processing system, one or more segments associated with the recommended set of similar segment identifiers, to the line item.

11. The method of claim 10, further comprising:
providing, by the processing system, to the campaign manager device associated with the line item, information about the new segment; and
receiving, by the processing system, from the campaign manager device associated with the line item, an indication to attach the new segment to the line item; and
subsequently, providing, by the processing system, advertisement content to targeted users according to the line item including the new segment.

12. The method of claim 10, wherein training the machine learning model comprises:
computing, by the processing system, a user-user co-occurrence matrix based on the information about browsing history for targetable users in the online advertising system; and
training, by the processing system, a user embedding model using the user-user co-occurrence matrix.

13. The method of claim 12, wherein computing the user-user co-occurrence matrix comprises:
identifying, by the processing system, user identifiers and uniform resource locators (URLs) associated with the user identifiers in the information about browsing history for targetable users in the online advertising system; and
storing, by the processing system, user identifiers for users having URLs in common in the user-user co-occurrence matrix.

14. The method of claim 10, further comprising:
providing, by the processing system, to the campaign manager device associated with the line item, information about the recommended set of similar segment identifiers; and
receiving, by the processing system, from the campaign manager device associated with the line item, an indication to attach the one or more segments associated with the recommended set of similar segment identifiers, to the line item; and
subsequently, providing, by the processing system, advertisement content to targeted users according to the line item including the one or more segments.

15. The method of claim 10, comprising:
forming, by the processing system, from the list of pairs of line items and segment identifiers, a segment-segment co-occurrence matrix;
forming, by the processing system, a segment embeddings machine learning model;
providing, by the processing system, the new segment to the segment embeddings machine learning model; and receiving, by the processing system, a list of segment identifiers sorted according to proximity to the new segment as the recommended set of similar segment identifiers.

16. A non-transitory, machine-readable medium, comprising executable instructions that, when executed by a processing system including a processor, facilitate performance of operations, the operations comprising:

receiving information about a line item of an online content delivery system, the information identifying a plurality of targeted users of the line item, wherein the receiving comprises receiving the information from a campaign manager device associated with the line item;

collecting browsing history of users in the online content delivery system;

predicting, using a machine learning model, a list of users likely to behave similarly to the targeted users;

forming a new segment from the list of users;

combining the new segment with information identifying the line item with information about other line items and segments to form a list of platform-wide line item, segment identifier pairs;

generating a second machine learning model, including
  forming a line item to segment mapping;
  generating a line item to segment co-occurrence matrix based on the line item to segment mapping;
  training the second machine learning model using information from the line item to segment co-occurrence matrix; and
  producing a segment embeddings space responsive to the training the second machine learning model;

receiving, from the second machine learning model, a list of recommended segments to add to the line item;

providing information about the new segment to the campaign manager device;

receiving, from the campaign manager device, an indication to attach the new segment to the line item; and subsequently, providing content to the targeted users according to the line item including the new segment.

17. The non-transitory, machine-readable medium of claim 16, wherein the operations further comprise:

providing the new segment to a segment embeddings machine learning model; and receiving a recommended set of similar segment identifiers corresponding to the list of recommended segments to add to the line item, wherein the receiving the recommended set of similar segment identifiers comprises receiving a list of segment identifiers sorted according to proximity to the new segment.

18. The non-transitory, machine-readable medium of claim 17, wherein the operations further comprise:

providing information about the recommended set of similar segment identifiers to the campaign manager device;

receiving, from the campaign manager device, an indication to attach one or more new segments associated with the recommended set of similar segment identifiers to the line item; and subsequently, providing content to the targeted users according to the line item including the one or more new segments.

19. The non-transitory, machine-readable medium of claim 16, wherein the operations further comprise:

forming a co-occurrence matrix for users based on the browsing history of users in the online content delivery system;

training an embedding space machine learning model using the co-occurrence matrix for users;

providing information about the targeted users to the embedding space machine learning model to the embedding space machine learning model; and receiving, from the embedding space machine learning model, the list of users likely to behave similarly to the targeted users responsive to providing the information about the targeted users to the embedding space machine learning model.

20. The non-transitory, machine-readable medium of claim 19, wherein the operations further comprise:

ranking the list of users according to a likelihood to behave similarly to the targeted users; and combining a predetermined number of users to form the new segment.

* * * * *